(12) United States Patent
Choi et al.

(10) Patent No.: US 10,739,111 B2
(45) Date of Patent: Aug. 11, 2020

(54) CLOAKING SYSTEMS AND METHODS

(71) Applicant: UNIVERSITY OF ROCHESTER, Rochester, NY (US)

(72) Inventors: Joseph S. Choi, Cypress, CA (US); John C. Howell, Jerusalem (IL)

(73) Assignee: UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 15/567,805

(22) PCT Filed: Apr. 21, 2016

(86) PCT No.: PCT/US2016/028665
§ 371 (c)(1),
(2) Date: Oct. 19, 2017

(87) PCT Pub. No.: WO2017/007526
PCT Pub. Date: Jan. 12, 2017

(65) Prior Publication Data
US 2018/0292179 A1   Oct. 11, 2018

Related U.S. Application Data

(60) Provisional application No. 62/150,687, filed on Apr. 21, 2015, provisional application No. 62/251,781, filed on Nov. 6, 2015.

(51) Int. Cl.
*F41H 3/00* (2006.01)
*G02B 27/00* (2006.01)
(Continued)

(52) U.S. Cl.
CPC .............. *F41H 3/00* (2013.01); *G02B 27/00* (2013.01); *G02B 27/0075* (2013.01);
(Continued)

(58) Field of Classification Search
None
See application file for complete search history.

(56) References Cited

U.S. PATENT DOCUMENTS 4,288,148 A   9/1981   Offner
4,870,485 A   9/1989   Toresu et al.
(Continued)

FOREIGN PATENT DOCUMENTS

CA   2984758   11/2016
CA   2998659   3/2017
(Continued)

OTHER PUBLICATIONS

Cai, et al., "Optical cloaking with metamaterials", Nat. Photon 2007, vol. 1, p. 224.
(Continued)

*Primary Examiner* — Heather R Jones
(74) *Attorney, Agent, or Firm* — Kilpatrick Townsend & Stockton LLP

(57) ABSTRACT

Digital cloaking is a method for practical cloaking, where space, angle, spectrum and phase are discretized. At the sacrifice of spatial resolution, a good approximation to an ideal cloak can be achieved—a cloak that is omnidirectional, broadband, and operational for the visible spectrum, three-dimensional (3D), and phase-matching for the light field, among other attributes. One example of a digital cloak is an active cloak that uses lenticular lenses, similar to integral imaging for 3D displays. With the continuing improvement in commercial digital technology, the resolution limitations of a digital cloak may be minimized, and a wearable cloak can be implemented.

27 Claims, 20 Drawing Sheets

(51) Int. Cl.
| | |
|---|---|
| H04N 5/74 | (2006.01) |
| H04N 13/307 | (2018.01) |
| H04N 13/232 | (2018.01) |
| H04N 9/31 | (2006.01) |
| G02B 30/27 | (2020.01) |
| H04N 13/229 | (2018.01) |
| H04N 13/305 | (2018.01) |
| G01C 3/14 | (2006.01) |
| G01S 17/42 | (2006.01) |

(52) U.S. Cl.
CPC ......... *G02B 27/0081* (2013.01); *G02B 30/27* (2020.01); *H04N 5/74* (2013.01); *H04N 9/3179* (2013.01); *H04N 13/229* (2018.05); *H04N 13/232* (2018.05); *H04N 13/305* (2018.05); *H04N 13/307* (2018.05); *G01C 3/14* (2013.01); *G01S 17/42* (2013.01); *G02B 2207/123* (2013.01)

(56) References Cited

U.S. PATENT DOCUMENTS

| | | |
|---|---|---|
| 4,881,068 A | 11/1989 | Korevaar et al. |
| 5,214,419 A | 5/1993 | Demond et al. |
| 5,220,631 A | 6/1993 | Grippin et al. |
| 5,231,538 A | 7/1993 | Anderson et al. |
| 5,307,162 A | 4/1994 | Schowengerdt |
| 5,627,554 A | 5/1997 | Jefferson |
| 5,684,621 A | 11/1997 | Downing |
| 5,745,197 A | 4/1998 | Eng et al. |
| 5,914,807 A | 6/1999 | Downing |
| 5,936,767 A | 8/1999 | Favalora |
| 5,943,160 A | 8/1999 | Downing |
| 5,956,172 A | 9/1999 | Downing |
| 6,466,184 B1 | 10/2002 | Scheps et al. |
| 6,501,590 B2 | 12/2002 | Bass et al. |
| 7,425,951 B2 | 9/2008 | Fukushima et al. |
| 7,446,733 B1 | 11/2008 | Hirimai |
| 7,537,345 B2 | 5/2009 | Sluss et al. |
| 7,858,913 B2 | 12/2010 | Newman et al. |
| 8,075,139 B2 | 12/2011 | Tull et al. |
| 8,247,755 B2 | 8/2012 | Refai et al. |
| 8,638,498 B2 | 1/2014 | Bohn et al. |
| 8,658,988 B2 | 2/2014 | Keiichi |
| 9,557,547 B2 | 1/2017 | Choi et al. |
| 9,706,186 B2 | 7/2017 | Shibazaki et al. |
| 9,798,153 B2 | 10/2017 | Ide |
| 9,807,377 B2 | 10/2017 | Hiddink et al. |
| 2002/0117605 A1* | 8/2002 | Alden ................ F41H 3/00 250/208.1 |
| 2003/0227415 A1 | 12/2003 | Joannopoulos |
| 2005/0062684 A1 | 3/2005 | Geng |
| 2006/0171032 A1 | 8/2006 | Nishioka |
| 2006/0192869 A1 | 8/2006 | Yoshino et al. |
| 2009/0051699 A1 | 2/2009 | Posa et al. |
| 2009/0128034 A1 | 5/2009 | Ku |
| 2009/0310231 A1 | 12/2009 | Maekawa |
| 2009/0316279 A1 | 12/2009 | Bowers |
| 2010/0066730 A1 | 3/2010 | Grossman |
| 2010/0265552 A1 | 10/2010 | Wang |
| 2011/0001429 A1 | 1/2011 | Davis |
| 2012/0268836 A1 | 10/2012 | Mercado |
| 2013/0341508 A1 | 12/2013 | Betsui |
| 2014/0111479 A1 | 4/2014 | Krah et al. |
| 2015/0029315 A1 | 1/2015 | Refai et al. |
| 2015/0365642 A1* | 12/2015 | Kline ................ G06F 3/013 348/143 |
| 2016/0025956 A1 | 1/2016 | Choi et al. |
| 2018/0052584 A1 | 2/2018 | Choi et al. |
| 2018/0267326 A1 | 9/2018 | Broadbent et al. |
| 2019/0141315 A1 | 5/2019 | Broadbent et al. |
| 2019/0230332 A1 | 7/2019 | Howell et al. |

FOREIGN PATENT DOCUMENTS

| | | |
|---|---|---|
| EP | 901212 | 3/1999 |
| EP | 2876879 | 5/2015 |
| EP | 3286596 | 2/2018 |
| EP | 3292436 | 3/2018 |
| EP | 3353593 | 8/2018 |
| EP | 3494457 | 6/2019 |
| JP | 61269518 | 11/1986 |
| JP | 2001358567 | 12/2001 |
| JP | 2018524639 | 8/2018 |
| JP | 2018524952 | 8/2018 |
| JP | 2018537701 | 12/2018 |
| WO | 02067196 | 8/2002 |
| WO | 03030099 | 4/2003 |
| WO | 2014024121 | 2/2014 |
| WO | 2016179158 A2 | 11/2016 |
| WO | 2016179158 A3 | 1/2017 |
| WO | 2017007526 A2 | 1/2017 |
| WO | 2017007526 A3 | 3/2017 |
| WO | 2017053336 | 3/2017 |
| WO | 2018027110 | 2/2018 |
| WO | 2018057902 | 3/2018 |

OTHER PUBLICATIONS

Chanda et al., "Large-area flexible 3d optical negative index metamaterial formed by nanotransfer printing," Nat. Nanotechnol. 2011 vol. 6, pp. 402-407.
Chen, et al., "Ray-Optics Cloaking Devices for Large Objects in Incoherent Natural Light" Nature Communications, 2013, vol. 4, p. 2652 (6 pages).
Chen, et al., Nat. Mater, "Transformation optics and metamaterials", 2010, vol. 9, p. 387-396.
Chen, et al., "Macroscopic Invisibility Cloaking of Visible Light" Nature Communications, 2011, vol. 2, pp. 1-6.
Chen et al., "Extending the bandwidth of electromagnetic cloaks," Phys. Rev. B 76, 241104, 2007.
Choi et al., "Paraxial ray optics cloaking," Opt. Express, 2014, vol. 22, pp. 29465-29478.
Choi et al., "Digital integral cloaking", Optica, 2016, vol. 3, No. 5, pp. 536-540.
Choi et al., "Paraxial full-field cloaking", Optics Express, 2015, vol. 23, pp. 15857-15862.
Clark, "1990 International Lens Design Conference Lens Design Problems: the design of a NonLens", SPIE, 1990, vol. 1354, pp. 558-569.
Collins, "Lens-system diffraction integral written in terms of matrix optics," J. Opt. Soc. Am. vol. 60, 1970, pp. 1168-1177.
Costa et al., "Achromatic lens based on a nanowire material with anomalous dispersion," Opt. Express, 2012, vol. 20, pp. 13915-13922.
Devaney, "Nonuniqueness in the Inverse Scattering Problem", J. Mathematical Physics, 1978, vol. 19, pp. 1526-1531.
Duan et al., "Geometric optics-based multiband cloaking of large objects with the wave phase and amplitude preservation," Opt. Express, 2014, vol. 22, pp. 27193-27202.
Ergin et al. "Three-dimensional invisibility cloak at optical wavelengths," Science, 2010, vol. 328, pp. 337-339.
Fleury et al., "Cloaking and invisibility: a review," Prog. Electromagn. Res., 2014, vol. 147, pp. 171-202.
Fleury et al., "Invisibility and Cloaking: Origins, present, and future perspectives,"Physical Review Applied, 2015, vol. 4, p. 037001.
Fridman, "Demonstration of Temporal Cloaking", Nature, 2012, vol. 481, pp. 62-65.
Gabrielli, et al., "Silicon nanostructure cloak operating at optical frequencies", Nat. Photon, 2009, vol. 3, p. 461.
Gbur, "Invisibility Physics: Past, Present Future", Progress in Optics, 2013, vol. 58, pp. 65-114.
Geng, "Three-dimensional display technologies", Advances in Optics and Photonics, 2013, vol. 5, pp. 456-535.
Giovampaola, et al., "Digital metamaterials", Nature Materials, 2014, vol. 13, pp. 1115-1121.

(56) References Cited

OTHER PUBLICATIONS

Greenleaf et al., "Anisotropic conductivities that cannot be detected by EIT," Physiol. Meas., 2003, vol. 24, pp. 413-419.
Greenleaf et al., "Full-wave invisibility of active devices at all frequencies," Commun. Math. Phys., 2007, vol. 275, pp. 749-789.
Greenleaf et al., "Isotropic transformation optics: approximate acoustic and quantum cloaking," New J. Phys., 2008, vol. 10, p. 115024.
Hamilton, et al., "Generalized refracton using lenslet arrays", Journal of Optics A: Pure and Applied Optics, 2009, vol. 11, p. 065502.
Hashemi et al., "Diameter-bandwidth product limitation of isolated-object cloaking," Phys. Rev. A, 2012, vol. 86, p. 013804.
Howell, "Amplitude-only, Passive, Broadband, Optical Spatial Cloaking of Very Large Optics", Applied Optics, 2014, vol. 53, pp. 1958-1963.
Kildishev et al., "Transformation optics: approaching broadband electromagnetic cloaking," New J. Phys., 2008, vol. 10, p. 115029.
Kim et al., Three-dimensional volumetric display in rubidium vapor, Optical Sensing II, vol. 2650, Mar. 1996, XP055284197, 11 pages.
Landy, et al., Nat. Mater., "A full-parameter unidirectional metamaterial cloak for microwaves", Nature Materials, 2013, vol. 12, pp. 25-28.
Leonhardt, "Optical Conformal Mapping", Science, 2006, vol. 312, pp. 1777-1780.
Leonhardt et al., Broadband invisibility by non-euclidean cloaking, Science, 2009, vol. 323, pp. 110-112.
Li et al., "Hiding under the Carpet: A New Strategy for Cloaking" Physical Review Letters, 2008 vol. 101, 203901, 4 pages.
Lippmann, "La Photographie Integrale, Comptes-Rendus", Academic Science, 1908, vol. 146, pp. 446-451.
Lippmann, "Integral Photography", Scientific American, Aug. 19, 1911, p. 164.
Liu, et al., Three-dimensional photonic metamaterials at optical frequencies, Nat. Mater., 2008, vol. 7, p. 31.
Liu, et al., "Broadband Ground-Plane Cloak", Science, 2009, vol. 323, p. 366.
Lukens, et al. "A temporal cloak at telecommunication data rate", Nature, 2013, vol. 498, pp. 205-208.
Ma, et al., "Experiments on active cloaking and illusion for laplace equation," Phys. Rev. Lett., 2013, vol. 111, p. 173901.
McCall, "Transformation Optics and Cloaking", Contemporary Physics, 2013, vol. 54, pp. 273-286.
Miller, "On perfect cloaking," Opt. Express, 2006, vol. 14, pp. 12457-12466.
Monticone et al., "Physical bounds on electromagnetic invisibility and the potential of superconducting cloaks," Photonics Nanostruct, 2014, vol. 12, pp. 330-339.
Monticone et al., "Do cloaked objects really scatter less?" Phys. Rev. X 3, 041005, 2013.
Nachman, "Reconstructions from Boundary Measurements", Annals of Mathematics, 1988, vol. 128, pp. 531-576.
Nielsen, The Digital Chameleon Principle: Computing Invisibility by Rendering Transparency, IEEE Computer Graphics and Applications, vol. 27, No. 1, Jan. 1, 2007, pp. 90-96.
Oxburgh, et al., "Transformation optics with windows", Proc. of SPIE, 2014, vol. 9193, p. 91931E.
PCT/EP2009/004697, "International Preliminary Report on Patentability", Jan. 27, 2011, 6 pages.
PCT/EP2009/004697, "International Search Report and Written Opinion", Oct. 27, 2009, 6 pages.
PCT/US2016/028665, "International Preliminary Report on Patentability", Nov. 2, 2017, 8 pages.
PCT/US2016/028665, "International Search Report and Written Opinion", dated Jan. 27, 2017, 12 pages.
PCT/US2016/030542, "International Preliminary Report on Patentability", dated Nov. 16, 2017, 12 pages.
PCT/US2016/030542, "International Search Report and Written Opinion", dated Dec. 5, 2016, 15 pages.
PCT/US2016/030542, "Invitation to Pay Add'l Fees and Partial Search Report", dated Sep. 6, 2016, 5 pages.
PCT/US2016/052738, "International Preliminary Report on Patentability", dated Apr. 5, 2018, 11 pages.
PCT/US2016/052738, "International Search Report and Written Opinion", dated Jan. 31, 2017, 17 pages.
PCT/US2016/052738, "Invitation to Pay Add'l Fees and Partial Search Report", dated Dec. 6, 2016, 5 pages.
PCT/US2017/045452, "International Search Report and Written Opinion", dated Oct. 16, 2017, 12 pages.
PCT/US2017/052972, "International Search Report and Written Opinion", dated Dec. 7, 2017, 19 pages.
Pendry et al., "Controlling Electromagnetic Fields" Science, 2006, vol. 312, pp. 1780-1782.
Platt, et al., "History and Principles of Shack-Hartmann Wavefront Sensing", Journal of Refractive Surgery, 2001, vol. 17, p. 11583233.
Schurig, et al., "Metamaterial Electromagnetic Cloak at Microwave Frequencies", Science, 2006, vol. 314, p. 977.
Shelby et al., "Experimental verification of a negative index of refraction," Science, 2001. vol. 292, pp. 77-79.
Schittny et al., "Invisibility cloaking in a diffusive light scattering medium", Science, 2014, vol. 345, pp. 427-429.
Silveirinha, "Anomalous refraction of light colors by a metamaterial prism," Phys. Rev. Lett., 2009, vol. 102, p. 193903.
Smolyaninov, et al., "Two-dimensional metamaterial structure exhibiting reduced visibility at 500 nm", Opt. Lett., 2008, vol. 33, p. 1342.
Smolyaninov, et al., "Anistropic Metamaterials Emulated by Tapered Waveguides: Application to Optical Cloaking", Phys. Rev. Lett., 2009, vol. 102, p. 213901, URL http://link.aps.org/doi/10.1103/PhysRevLett.102.213901.
Soukoulis et al., "Past Achievements and Future Challenges in 3D Photonic Metamaterials," Nat. Photonics, Jul. 2011, vol. 5, 18 pages.
Soukoulis et al., "Past achievements and future challenges in the development of three-dimensional photonic metamaterials," Nat. Photonics, Sep. 2011, vol. 5, pp. 523-530.
Szczys, Virtual Windows that Track a Viewer's Position, http://hackaday.com/2010/04/16/virtual-windows-that-track-a-viewers-position (downloaded from internet archives Jun. 19, 2018), all pages.
Theisen et al., "Optical Properties of Gallium Implanted Silicon," in Frontiers in Optics 2012/Laser Science XXVIII, OSA Technical Digest (online) (Optical Society of America, 2012), p. FTu4A.3.
U.S. Appl. No. 14/714,671, Non-Final Office Action, dated May 23, 2016, 11 pages.
U.S. Appl. No. 14/714,671, Notice of Allowance, dated Sep. 28, 2016, 7 pages.
Valentine et al., "Three-dimensional optical metamaterial with a negative refractive index," Nature, 2008, vol. 455, pp. 376-379.
Valentine et al., "An optical cloak made of dielectrics", Nat. Mat., 2009, vol. 8, p. 568.
Vasquez, et al., "Active exterior cloaking for the 2d laplace and helmholz equations", Physical Review Letters, 2009, vol. 103, p. 073901.
Veselago, "Electrodynamics of substances with simultaneously negative values of sigma and mu," Phys.-Usp. 1968, vol. 10, pp. 509-514.
Winscape, http://www.rationalcraft.com/Winscape.html, (downloaded from Internet Archive Wayback Machine on Aug. 1, 2018), all pages.
Wolf et al., "Invisible bodies and uniqueness of the inverse scattering problem," Journal of Modern Optics, 1993, vol. 40, pp. 785-792.
Xiao, et al., "Advances in three-dimensional integral imaging: sensing, display, and applications", Applied Optics, 2013, Issue 4, pp. 546-560.
Zhai, et al., "An effective broadband optical 'cloak' without metamaterials", Laser Physics Letters, 2013, vol. 10, p. 066002.
Zhang et al., "Macroscopic Invisibility Cloak for Visible Light", Physical Review Letters, 2011, vol. 106, pp. 033901-1-033901-4.
PCT/US2017/045452, "International Preliminary Report on Patentability", Feb. 14, 2019, 7 pages.

(56) References Cited

OTHER PUBLICATIONS

U.S. Appl. No. 15/682,679, "Notice of Allowance", dated Aug. 22, 2019, 8 pages.
EP16787951.9 Office Action dated Dec. 6, 2018, 4 pages.
U.S. Appl. No. 15/682,679, Restriction Requirement dated Dec. 14, 2018, 6 pages.
International Application No. PCT/US2017/052972, International Preliminary Report on Patentability dated Apr. 4, 2019, 12 pages.
U.S. Appl. No. 15/571,514, Non-Final Office Action dated May 17, 2019, 18 pages.
EP 16787951.9, Office Action, dated Oct. 8, 2019, 4 pages.
U.S. Appl. No. 15/761,820, Non-Final Office Action, dated Nov. 15, 2019, 13 pages.

* cited by examiner

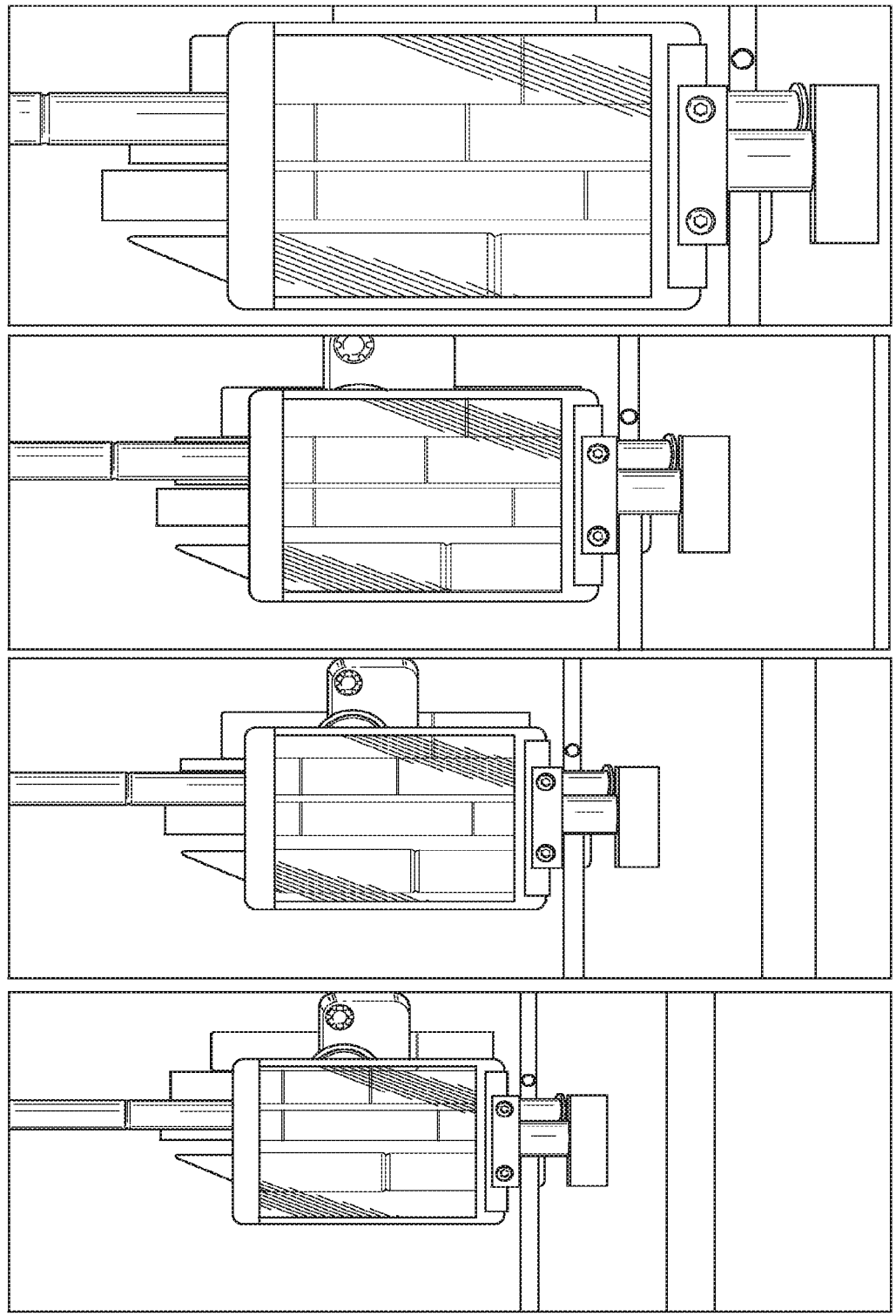

CLOAKING SYSTEMS AND METHODS

CROSS REFERENCE TO RELATED APPLICATIONS

This application claims priority to and the benefit of U.S. Provisional Patent Application 62/150,687 filed Apr. 21, 2015 and U.S. Provisional Patent Application 62/251,781 filed Nov. 6, 2015, the contents of which are incorporated herein by reference in their entirety.

STATEMENT REGARDING FEDERAL FUNDING

This invention was made with government support under W911 NF-12-1-0263 awarded by Army Research Office and W31P4Q-12-1-0015 awarded by DARPA DSO. The U.S. government has certain rights in the invention.

BACKGROUND

Optical spatial cloaking has captured the imagination of both the popular culture and scientific communities (see, e.g., Gbur, G. Invisibility physics: Past, present, and future. Progress in Optics 58, 65-114 (2013)). Seminal works in optical spatial cloaking includes work by Leonhardt (Leonhardt, U. Optical conformal mapping. Science 312, 1777-1780 (2006)) and Pendry, Schurig, and Smith (Pendry, J. B., Schurig, D. & Smith, D. R. Controlling electromagnetic fields. Science 312, 1780-1782 (2006)). These seminal works provide a theoretical framework to create a curved space for light waves, by carefully constructing materials in Cartesian space. This new field of research has been called 'transformation optics' (McCall, M. Transformation optics and cloaking. Contemporary Physics 54, 273-286 (2013)). Experimental realization of such transformational optics has been difficult, due to the previously perceived need for artificial electric and magnetic materials (called 'metamaterials'), the narrow-band spectrum involved, infinite phase velocity (or negative index to compensate this), and anisotropy in the theory (Gbur, G. Invisibility physics: Past, present, and future. Progress in Optics 58, 65-114 (2013)). Nonetheless, inspired by transformation optics, there have been some advances in optical spatial cloaking. These advances include a two-dimensional microwave cloak (Schurig, D. et al. Metamaterial electromagnetic cloak at microwave frequencies. Science 314, 977-980 (2006)); a 'carpet cloak' that hides an object under a surface (Li, J. S. & Pendry, J. B. Hiding under the carpet: A new strategy for cloaking. Physical Review Letters 101, 203901 (2008)); and even cloaking in time (Fridman, M., Farsi, A., Okawachi, Y. & Gaeta, A. L. Demonstration of temporal cloaking. Nature 481, 62-65 (2012)), and (Lukens, J. M., Leaird, D. E. & Weiner, A. M. A temporal cloak at telecommunication data rate. Nature 498, 205-208 (2013)). A few groups have been able to cloak millimeter to centimeter-sized objects as well, using birefringent materials (Zhang, B. L., Luo, Y. A., Liu, X. G. & Barbastathis, G. Macroscopic invisibility cloak for visible light. Physical Review Letters 106, 033901 (2011)), and (Chen, X. Z. et al. Macroscopic invisibility cloaking of visible light. Nature Communications 2, 176 (2011)).

To overcome the metamaterial requirements and to extend cloaking to a broadband, visible regime for large objects, researchers have recently looked to ray optics for cloaking (see, e.g., Chen, H. et al. Ray-optics cloaking devices for large objects in incoherent natural light. Nature Communications 4, 2652 (2013); Zhai, T. R., Ren, X. B., Zhao, R. K., Zhou, J. & Liu, D. H. An effective broadband optical 'cloak' without metamaterials. Laser Physics Letters 10, 066002 (2013); and Howell, J. C., Howell, J. B. & Choi, J. S. Amplitude-only, passive, broadband, optical spatial cloaking of very large objects. Applied Optics 53, 1958-1963 (2014)). In these cloaks, the amplitude and direction of light fields are considered, as opposed to the full preservation of fields (amplitude and phase) of transformation optics. These designs have been able to cloak centimeter to meter-sized objects with commonly available optics. Yet, these schemes work only for unidirectional incident light, as they are not designed for continuous multidirectional cloaking, and can have non-unity magnifications. For off-axis, non-zero angles, the background images show distortion and positional shifts. This is particularly true if the background is far away from the cloaking device. In addition, as seen in FIG. 1 of Howell, J. C., Howell, J. B. & Choi, J. S. Amplitude-only, passive, broadband, and optical spatial cloaking of very large objects. Applied Optics 53, 1958-1963 (2014), rays that propagate through the system, but go through the center at non-zero angles, can actually enter the cloaking region, effectively uncloaking the space.

Despite the advances in cloaking, a 3-D multidirectional cloak has been challenging. As shown by Wolf and Habashy (Wolf, E. & Habashy, T. Invisible bodies and uniqueness of the inverse scattering problem. Journal of Modern Optics 40, 785-792 (1993)) and Nachman (Nachman, A. I. Reconstructions from boundary measurements. Annals of Mathematics 128, 531-576 (1988)), no previously known isotropic cloaking scheme can hide an object from all viewing angles. Their work answered a question that stemmed from Devaney (Devaney, A. J. Nonuniqueness in inverse scattering problem. Journal of Mathematical Physics 19, 1526-1531 (1978)), who elegantly showed how to mathematically construct potentials that have zero scattering fields, and are hence invisible. Devaney's result, however, was for a finite number of discrete directions, and not for a continuous range of angles.

An 'ideal' invisibility cloak can be considered to be broadband, omni-directional, 3D, macroscopic, and operational in the visible spectrum, and with matching of phase for the full-field of light [1]. Scientific research into invisibility cloaking gained momentum with the initial omnidirectional cloaking designs that used artificial materials (metamaterials) [2, 3]. These guide electromagnetic waves around a hidden object, using metamaterials that are specifically engineered with coordinate transformations, so they are called 'transformation optics' cloaks. Many interesting designs have resulted from transformation optics, but due to their narrow bandwidth, anisotropy, and manufacturing difficulties, practical cloaks have been challenging to build [4].

Broad bandwidth and omnidirectionality appear to be the main competing elements for ideal invisibility cloaking, as both have been believed to be unachievable simultaneously [5, 6] in the past. Thus, to demonstrate cloaking, researchers have relaxed these or other ideal characteristics. Some of these efforts include broadband 'carpet cloaks' for visible light on reflective surfaces [7], unidirectional phase-matching cloaks [8], macroscopic ray optics cloaking [9, 10], a cylindrical cloak for visible light through a diffusive medium [11], or a cloak that achieves all in the small-angle regime [6].

SUMMARY

Cloaking technologies will be discussed that can hide objects from human vision. The ideas behind the cloaks are based on the fact that, in at least some non-limiting examples, a perfect (or substantially perfect) ray-optics cloak preserves (or substantially preserves) the direction, position and spectrum of all incoming rays. In some instances, this may be shown to be realized with lens arrays on top of collection and emission arrays. The cloaks can be made to be continuously workable over a large range of angles and can be designed to eliminate edge effects. A passive version of the cloak can be designed to thwart lidar, hyperspectral and radar imaging systems. Simpler designs requiring only a camera and projection display are also discussed.

The implications of invisibility are enormous in everything from stealth to imaging to medicine. The ultimate objective, in at least some uses, is broadband, omni-directional full-field invisibility. The ideal system, in at least some instances, would be invisible to any detection apparatus over its imaging wavelength capabilities from any viewing direction. While both active and passive invisibility systems that hide objects from human observers from nearly all directions are considered, the effectiveness of the cloaks outlined herein is described against other imaging techniques as well. At least some of the systems described may not suffer from edge effects, may be broadband over the range of human visual perception, and/or work for an infinite number of observers over a wide range of angles. In some embodiments, the phase of a field may not necessarily be preserved.

In some embodiments, a cloak of invisibility based on ray optics (one that doesn't necessarily preserve the phase of the field) preserves the position, frequency and the direction of an incoming ray. This work is somewhat related to "Integral Imaging", which relies on ray preservation to achieve three-dimensional imaging (for a review see Xiao Xiao, Bahram Javidi, Manuel Martinez-Corral, and Adrian Stern, Applied Optics, Vol. 52, Issue 4, pp. 546-560 (2013)). Integral Imaging, however, is not sufficient for an invisibility cloak. For example, in at least some instances, for a finite cloaking volume, the preservation of the trajectory of the ray requires shifting the emission pixels for a given incoming ray direction. Such cloaks as described herein may include systems that either detect and reemit (active systems) or maintain (passive systems) all three of these aspects of every incoming ray. Microlens arrays atop detector arrays may achieve these capabilities at the cost of space-bandwidth limitations. One example of space bandwidth limited detection of an incoming field is a Shack Hartman sensor used in wavefront sensing. Both the wavefront direction and spatial aspects of an incoming field may be determined by using a microlens array on top of a higher resolution detector array. The spatial resolution of the detection system is set by the microlens array pitch and the direction resolution is set by the relative size of the lens/detector pitch. However, for a given detector array, higher spatial resolution may result in lower direction resolution and vice versa. By using such lens/detector arrays to collect or detect light and an inverse lens/detector arrays to emit or redirect the light, rays may be guided around a cloaking region. In at least some of the embodiments described below, the cloaking system is far enough away from the observer that the spatial resolution of the invisibility system is better than the resolvable spatial resolution of the human eye. In at least some of the embodiments described below, there is 100% fill factor or substantially 100% fill factor for the arrays, so that no perceptible optically dead zones exist in the system.

Non-limiting examples of such systems and methods are described below that are practical to build, and which utilize commercially available technologies that are improving independent of any cloaking efforts. This may be accomplished, in some embodiments, by discretizing space, angle, spectrum and phase, as an approximation to ideal cloaking. Since detectors, including imaging systems such as our eyes, are limited in resolution (spatially and temporally), digital cloaking can appear to be omnidirectional for a broad spectrum when observed. For human visual acuity, resolution finer than about 30 arcseconds is sufficient [12] for some systems and methods, although other resolutions (greater or less than 30 arcseconds) may also be appropriate for other digital cloaking systems and methods.

In some implementations, the digital cloak may be an active device that utilizes external power input. However, a digital cloak may also utilize passive discretized cloaking in some implementations. Active cloaks have been proposed before, where the incoming signals are known a priori, or detected quickly, such that outgoing signals from antennas cancel the incoming wave(s) [13]. Other active cloaks, that compensate for absorption and increase bandwidth, may use active metamaterial surfaces for dominant scattering cancellation, or electronic circuits for acoustic cloaking [5]. These methods rely on custom-engineered material, whereas, in at least some implementations, digital cloaks disclosed herein may use commercially available digital technology, which may be advantageous for scaling and implementation in at least some implementations.

In one embodiment, a cloaking system includes a light detector configured to detect light approaching a cloaking volume from a first side, the detected light characterized by a plurality of first light rays incident on the light detector; and a light emitter configured to emit light away from a second side of the cloaking volume, the emitted light characterized by a plurality of second light rays, the light emitter comprising a first lens array positioned over an emitter array, the light emitter configured to emit the light such that at least some of the second light rays are substantially aligned with at least some of the first light rays.

In some instances, the light detector comprises a second lens array positioned over a detector array.

In some instances, the light detector is configured to detect both positions and directions of at least some of the plurality of first light rays incident on the light detector.

In some instances, the emitter array comprises a plurality of light emission regions, wherein at least some of the lenses of the first lens array are each positioned over a group of the plurality of light emission regions, wherein the detector array comprises a plurality of light detection regions, wherein at least some of the lenses of the second lens array are each positioned over a group of the plurality of light detection regions.

In some instances, at least some of the light detection regions are each correlated with a corresponding light emission region such that detection of light at a particular light detection region results in emission of light at a particular light emission region.

In some instances, the light detection and emission regions include a first light detection region corresponding to a first light emission region, the first light detection and emission regions aligned along a first axis, and a second light detection region corresponding to a second light emission region, the second light detection and emission regions aligned along a second axis, wherein the first and second axes are non-parallel.

In some instances, the light detection and emission regions include a third light detection region corresponding to a third light emission region, the third light detection and emission regions aligned along a third axis, wherein the first and third axes are non-parallel, wherein the second and third axes are parallel.

In some instances, the detector array comprises at least one solid state image sensor.

In some instances, the solid state image sensor comprises a CCD sensor or a CMOS sensor.

In some instances, the detector and emission arrays comprise fiber optics.

In some instances, the cloaking system is configured to at least partially surround the cloaking volume.

In some instances, the light detector and light emitter are planar.

In some instances, at least one of the light detector and light emitter are curved or angular.

In some instances, the light detector and light emitter each include at least one edge, wherein the edge of the light detector meets the edge of the light emitter.

In some instances, the cloaking volume is between the detector and emitter arrays, wherein the detector and emitter arrays are between the first and second lens arrays.

In some instances, individual regions of the detector array are each mapped to individual regions of the emitter array such that detection of light at one of the individual regions of the detector array results in emission of light at one of the individual regions of the emitter array.

In another embodiment, a method of cloaking a cloaking volume that is at least partially between a light detector and light emitter includes: measuring positions and directions of at least some of a first plurality of light rays approaching the light detector, the light detector comprising a first lens array configured to measure the positions of the light rays and a detector array configured to measure the directions of the light rays; and emitting a second plurality of light rays from the light emitter, the light emitter comprising a second lens array and an emitter array, wherein at least some of the second plurality of light rays are substantially aligned in positions and directions with at least some of the first plurality of light rays, such that the cloaking region is at least partially cloaked to human vision.

In another embodiment, a cloaking system includes: a light detector configured to detect light approaching a cloaking volume from a first side, the detected light characterized by a plurality of first light rays incident on the light detector; and a light emitter configured to emit light away from a second side of the cloaking volume, the emitted light characterized by a plurality of second light rays, the light emitter comprising a first lens array positioned over an emitter array.

In some instances, the light detector is configured to capture a background image, and wherein the light emitter is configured to project at least a portion of the background image.

In some instances, an appearance of the projected background image to an observer changes depending on a position of the observer relative to the light emitter.

In some instances, the system is configured to parse the background image into a plurality of sub-images.

In some instances, the system is configured to interleave the sub-images, wherein the emitter array is configured to project the background image as the interleaved sub-images.

In some instances, the system further includes a depth detector configured to collect information about depths of objects located on the first side of the cloaking volume.

In some instances, the light detector is configured to capture a background image from the first side of the cloaking volume, wherein the system is configured to capture information about depths of objects in the background image.

In another embodiment, a method of making a cloaking system for a cloaking volume includes capturing one or more images of a background located on a first side of the cloaking volume; and generating a scene from the one or more captured images, the generated scene configured to be positioned behind a lens array on a second side of the cloaking volume to cloak the cloaking volume.

In some instances, capturing the one or more images comprises capturing a plurality of images, and wherein generating the scene comprises interleaving the plurality of captured images.

In some instances, generating the scene comprises printing a static scene.

In some instances, the lens array comprises a lenticular lens array and wherein the generated scene comprises a plurality of columns, at least some of the columns corresponding to different viewing positions relative to the background.

In still further aspects, a multi-directional cloaking system may be provided that includes a plurality of discrete light detection pixels configured to detect light approaching a cloaking volume. The detected light may be characterized by a plurality of first light rays. A plurality of discrete light emission pixels may be provided that are configured to emit light away from the cloaking volume. The emitted light may be characterized by a plurality of second light rays. The plurality of discrete light emission pixels may be configured to emit the emitted light such that at least some of the second light rays are substantially aligned with at least some of the first light rays.

In some aspects, the multi-directional cloaking system may be spherically symmetric.

Optionally, at least some of the plurality of discrete light emission pixels may be spatially discrete. In some embodiments, at least some of the plurality of discrete light emission pixels each comprise a plurality of discrete light emission sub-pixels corresponding to a plurality of discrete light emission directions.

In further aspects, at least some of the plurality of discrete light detection pixels may be spatially discrete. At least some of the plurality of discrete light detection pixels may each comprise a plurality of discrete light detection sub-pixels corresponding to a plurality of discrete light detection directions. In some embodiments, at least some of the plurality of discrete light detection pixels may include apertures. At least some of the plurality of discrete light detection sub-pixels may include non-planar arrays of light detectors beneath at least some of the apertures.

In some embodiments, at least some of the plurality of discrete light detection pixels comprise lenslets. At least some of the plurality of discrete light detection sub-pixels may include light detectors beneath at least some of the lenslets.

Optionally, at least some of the discrete light detection pixels may be each associated with one of the discrete light emission pixels such that detection of light at one of the individual discrete light detection pixels results in emission of light at one of the individual discrete light emission pixels.

The association between the discrete light detection pixels and discrete light emission pixels may be dynamic, such that movement of one or more of the discrete light detection pixels relative to the discrete light emission pixels changes the association between particular discrete light emission pixels and light detection pixels.

In some instances, the multi-directional cloaking system may be phase-matching.

In still further embodiments, a passive cloaking system may be provided that includes an input lenslet array comprising a plurality of lenses for collecting light rays with direction and position properties and an output lenslet array comprising a plurality of lenses for emitting the collected light rays. The input lenslet array and the output lenslet array may define a cloaking region between the input lenslet array and the output lenslet array. A plurality of optical fibers may be provided that are routed through the cloaking region and that optically couple lenses of the input lenslet array with lenses of the output lenslet array such that the light rays collected by the input lenslet array are emitted by the output lenslet array and such that at least some of the emitted light rays are substantially aligned with at least some of the collected light rays.

In some embodiments of the passive cloaking system, the emitted light rays preserve spectral properties of the collected light rays. The lenses of the input lenslet array may focus collected light into a fiber core of a corresponding optical fiber. The plurality of optical fibers may be multi-mode optical fibers.

BRIEF DESCRIPTION OF THE DRAWINGS

FIGS. 12(c')-(f') show the blocks of FIGS. 12(c)-(f) at the same viewing angles as FIGS. 12(c)-(f) without the cloak.

FIGS. 13(a)-(d) show exemplary screen shots from an observer camera that is moved longitudinally to different distances in front of the cloak.

DETAILED DESCRIPTION

Figure 1A:
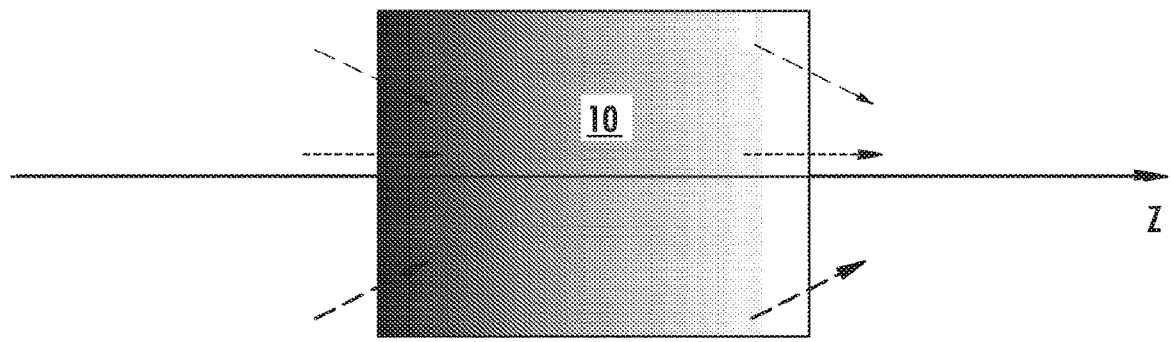
FIGS. 1A through 1C schematically illustrate possible candidates for ray-based spatial cloaking.
Figure 1B:
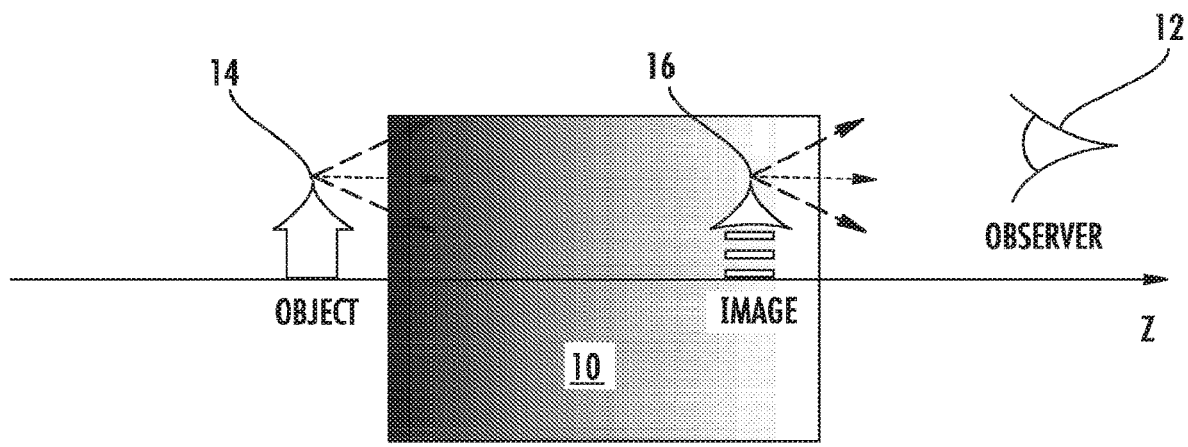
Figure 1C:
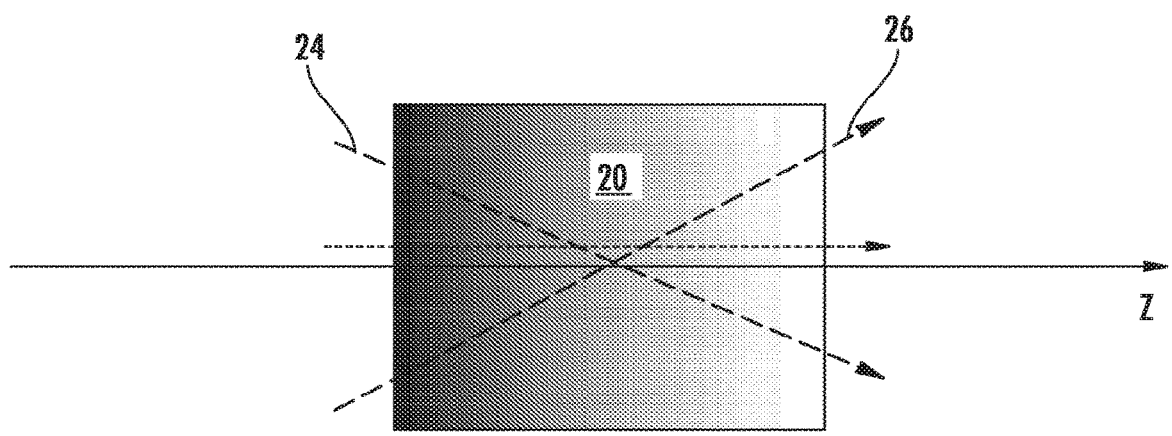

FIGS. 1A through 1C schematically illustrate possible candidates for ray-based spatial cloaking. FIG. 1A illustrates an identity transformation, in which rays entering an identity transformation black box 10 from the left exit to the right with the same positions and directions. FIG. 1B illustrates how an observer 12 would view an object 14 disposed behind the identity transformation black box 10. To the observer 12, the object 14 would appear to be closer than its actual position, by the length of the box, and therefore appear to be located at image 16.

In some instances, it may be desirable to minimize or eliminate this effect. In other words, in some instances cloaking systems or methods may make objects behind the cloaking region appear to be where they are and/or act the same way as if the system was filled with the surrounding medium (e.g., to cloak in air, the cloaking device may act as if it was filled with air). FIG. 1C schematically illustrates one example of such a system 20 that contains a non-zero cloaking region to hide an object, and behaves as if its entire region was replaced by the surrounding medium for light rays entering it. In the system 20 of FIG. 1C, light rays 26 coming out of the system are aligned or substantially aligned with light rays 24 entering the system. In other words, the light rays 24 approaching the system 20 may be characterized as extending along axes that are incident on the system 20 at various positions and directions, and the system may be configured to emit light rays 26 along axes that are aligned or substantially aligned with the corresponding axes of the approaching light rays 24, without being disturbed by any objects within the cloaking region of system 20. As will be apparent to those of ordinary skill in the art from the discussion below, in at least some embodiments, the emitted light rays 26 will not necessarily be in perfect alignment with the approaching light rays 24, depending upon, for example, the resolution of the system's 20 ability to detect and/or emit light at particular spatial positions and directions.

Ray-Preserving Cloaking Systems

Figure 2:
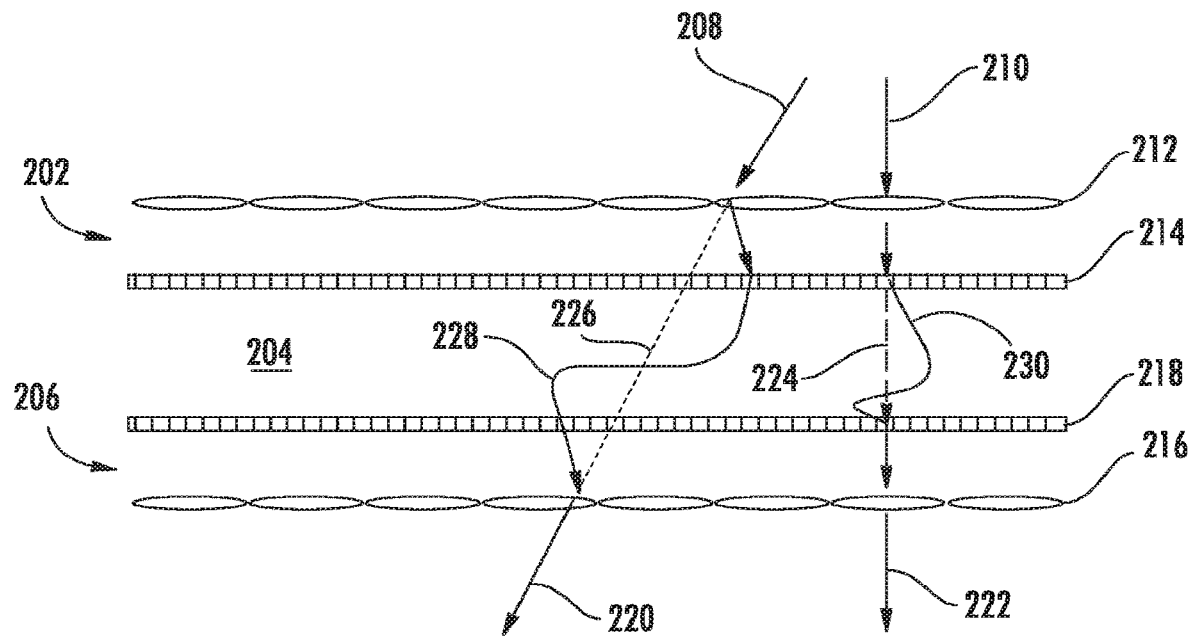
FIG. 2 schematically shows an embodiment of a ray-preserving cloaking system.

FIG. 2 schematically shows an embodiment of a ray-preserving cloaking system. The cloaking system of FIG. 2 includes a light detector 202, a cloaking region 204, and a light emitter 206.

The light detector 202 is configured to detect light approaching the cloaking region 204, which may be characterized by incoming light rays such as rays 208, 210. In this embodiment, the light detector 202 is configured to detect the positions and directions of the incoming light rays 208, 210. In some embodiments, the light detector 202 is also configured to detect the spectral content of incoming light rays 208, 210. The light detector 202 includes a lens array 212 (e.g. a micro-lens array) positioned over a detector array 214 (e.g. an image sensor). As shown in FIG. 2, incoming light rays 208, 210 hit particular lenses of the lens array 212. Light rays 208, 210 are refracted by the lenses to hit a particular light detection region of the detector array 214 (e.g. a particular pixel or pixels of an image sensor).

In the embodiment of FIG. 2, the pitch of the lens array 212 determines or impacts on the spatial resolution of the light detector 202 for incoming rays. In some embodiments, lens array 212 may have a spatial resolution in the range of a few hundred microns to a few millimeters. In the embodiment of FIG. 2, each lens of the lens array 212 is positioned above or otherwise configured to direct light to a particular group of detection regions in the detector array 214. The pitch of the detection regions of the detector array 214, or the number of detection regions in a group associated with a particular lens of the lens array 212, determines or impacts on the directional resolution of the light detector 202 for incoming light rays. For example, for an incoming light ray incident on a particular lens of the lens array 212, the direction of that light ray will determine which of the detection regions associated with that particular lens will be hit by that ray, and greater numbers of detection regions for each lens will allow for greater directional resolution.

The light emitter 206 of FIG. 2 is configured to emit light, which may be characterized by outgoing light rays 220, 222. The light emitter 206 emits light rays 220, 222 in response to the detection of light rays 208, 210 by the light detector 202. In this embodiment, the outgoing light rays 220, 222 are aligned (in position and direction) with corresponding incoming light rays 208, 210. As will be apparent to one of ordinary skill in the art, the alignment of incoming and outgoing light rays will not necessarily be perfect alignment, and may depend, among other things, on the resolution of the light detector 202 and light emitter 206.

The light emitter 206 includes a lens array 216 with an emitter array 218 below it. The emitter array 218 includes several light emission regions (e.g. individual pixels) beneath each lens of the lens array 216. Particular light emission regions in the emitter array 218 correspond to particular light detection regions in the detector array 214. For example, in some embodiments, every pixel in the detector array 214 may have a single emission pixel in the emitter array 218. The corresponding pixels of the emitter array 218 can then (in conjunction with lens array 216) emit outgoing light rays 220, 222 with both the proper direction up to the direction resolution of the detector array 214 and the proper position up to the position resolution of the lens array 212. In some embodiments, the light detector 202 and/or light emitter 206 may be configured to also preserve or otherwise account for the frequency and other aspects of incoming light so that the emitter characteristics match the incoming light characteristics. Thus, in the embodiment of FIG. 2, things within the cloaking region 204 between the light detector 202 and the light emitter 204 may be cloaked/rendered invisible.

Those of skill in the art will recognize that a wide variety of lens arrays may be used for the cloaking system, including a wide variety of commercially available microlens arrays formed of various substrates, in various lens or lenslet pitches, various lens shapes, various fill factors, various lens diameters, and other attributes. In some embodiments, the lens arrays may have a lens pitch in the range of 50 μm to 5 mm. In some embodiments, the lens arrays may have collection/emission angles in the range of 10 to 60 degrees, typical of 3D and animation lenticular lenses. Larger angles can be achieved through careful lens processing. For embodiments that allow for large angle cloaking, lens arrays incorporating aspheres may be utilized, although those of skill in the art will recognize that larger angle cloaking applications may, in at least some instances, also require larger number of light detection/emission regions for each lens. Typical lenticular and Fly's eye lenses come in a large range of resolution. For example, commercially available lenticular lenses have up to more than 100 lenses per inch and down to as little as 7.5 lenses per inch.

A wide variety of detector/emitter arrays may also be used for the cloaking system. In some instances, the detector array may be one or more solid state image sensors, such as one or more CCD or CMOS sensors. In some instances, the emitter array may be a CRT, LCD, LED, plasma, or other type of display or monitor, or include similar components as such displays or monitors.

Returning to cloaking device of the embodiment of FIG. 2, particular light emission regions in the emitter array 218 correspond to particular light detection regions in the detector array 214 such that detection of an incoming light ray at a particular detection region will result in emission of an outgoing light ray at a corresponding emission region with a position and direction that aligns with the incoming light ray. As the cloaking system of FIG. 2 is configured to detect and emit light rays in a variety of directions, corresponding detection and emission regions may be aligned relative to one another in a variety of angulations. For example, as shown in FIG. 2, the corresponding detection and emission regions for detecting and emitting light rays 210 and 222 are aligned along an axis 224, and the corresponding detection and emission regions for detecting and emitting light rays 208 and 220 are aligned along an axis 226, with the axes being non-parallel relative to one another. Although not specifically shown in FIG. 2, other corresponding pairs of detection and emission regions will be aligned along axes that are parallel to axes 226 or 224, and still other corresponding pairs of detection and emission regions will be aligned along axes that are aligned at other angulations that are not parallel to either of axes 226 or 224.

In some embodiments, the correlation between particular detection and emission regions of the arrays 214 and 218 is fixed. For example, in the embodiment shown in FIG. 2, corresponding pairs of detection and emission regions may each have a dedicated communication channel (e.g. a wire) connecting them, such as the wires 228 and 230 connecting corresponding detection and emission regions. In at least some of these embodiments, the cloaking system may be designed for the light detector 202 and light emitter 206 to remain in pre-determined positions and orientations relative to one another. For example, in some instances, the light detector 202 and light emitter 206 may be secured relative to one another in fixed positions and orientations or may be required to be set up with particular spacing and orientation between them. In other embodiments, however, the correlation between particular detection and emission regions of the arrays 214 and 218 may change depending on a change in position and/or orientation of the light detector 202 relative to the light emitter 206. In such embodiments, the cloaking system may include functionality including computer processing functionality for monitoring changes in relative positions and orientations of the light detector 202 and light emitter 206 and adjusting the correlation of particular detection and emission regions of the arrays 214 and 218.

While not shown in the Figures, in some cloaking system embodiments, internal components of the system (e.g. components behind the light detector 202 and light emitter 206) may be configured to visually reconstruct the external environment. For example, a display inside of the cloaking system may display what is on the outside of the cloak, using the same ray information collected by the light detector 202.

Figure 3:
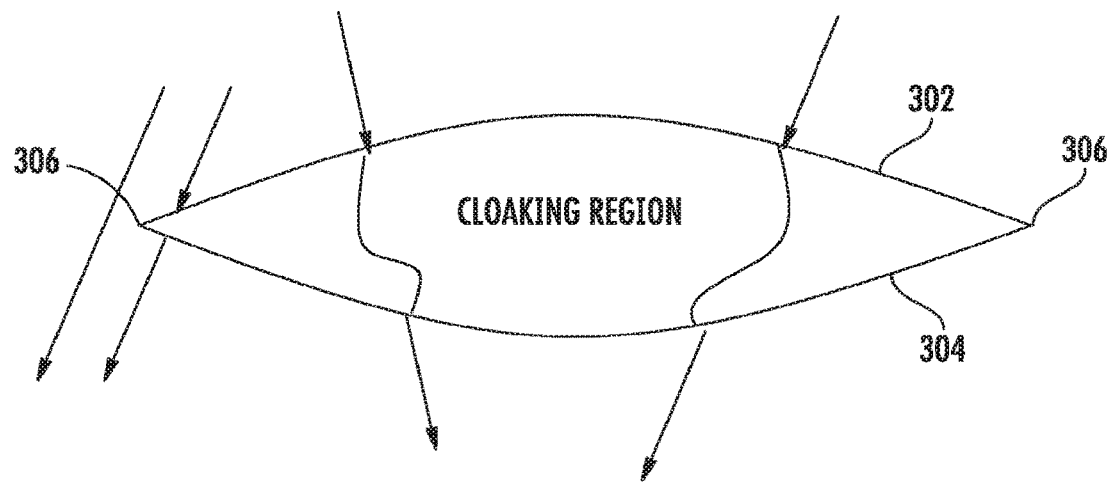
FIG. 3 schematically shows another embodiment of a ray-preserving cloaking system.

FIG. 3 illustrates another example of a cloaking system. In FIG. 3, the cloaking system is configured to reduce or eliminate edge effects that may be present in cloaking systems in which the detection and emission planes are separated by a finite distance, such as with the example shown in FIG. 2. In the system of FIG. 2, there will be edge effects for some rays that do not come in perpendicular to the planes, and there will be some pixels either in the detection or the emission plane that have no correlated pixel. In the system of FIG. 3, the light detector 302 and light emitter 304 are curved, angular or otherwise configured in non-planar manners such that they meet at edges 306, reducing or eliminating such edge effects.

In some non-limiting instances, a cloaking system may be configured to cloak a cloaking volume from multiple sides of the cloaking volume. For example, a first side of the cloaking volume could include detection and emission arrays, and a second side of the cloaking volume could also include detection and emission arrays, with the emission array on the second side emitting light in response to light detected by the detector array on the first side, and the emission array on the first side emitting light in response to light detected by the detector array on the second side.

Passive Ray-Preserving Cloaking Systems

While cloaking systems such as those described above may fool the human visual system, in at least some instances, both hyperspectral imaging and ranging detection could reveal the cloaking system. For a lidar system, a source emits a pulse or frequency ramped signal. In 3D lidar, the time-of-flight for each transverse pixel may reveal a flat region at an unexpected distance and thus may reveal the cloak. In hyperspectral imaging, images are reconstructed every few nm over the range of frequencies of interest. For a standard Red-Green-Blue flat panel display (the emission plane), the artificial color could potentially be apparent when reconstructed.

In some instances, a passive cloaking system may be employed to overcome these advanced detection techniques. In some embodiments, the passive cloaking system may use fibers between the correlated detection and emission regions (e.g. with the two ends of a fiber constituting the correlated detection and emission pixels). For example, all of the incoming light may be collected into broadband multi-mode fibers and routed to and emitted from the appropriate emission regions to preserve the rays, including their spectral properties along with their direction and position properties. With high quality anti-reflection coatings, nearly 100% of the incoming light can be collected by layering microlens arrays of appropriate size. On the collection end, a low resolution lens array would collect the position information and a high resolution array would ensure all of the light was focused into the fiber cores. This would ensure that the cloak was high brightness.

In some instances, such a passive cloaking system may counter a hyperspectral imaging system, because the natural light would be collected and appropriately reemitted with nearly 100% efficiency. Optical light detection and ranging systems could detect a shift in depth from a reference background, but perhaps small enough to be unnoticed when the background is not smooth. In some instances, such a cloaking system could be further modified to reduce its radar cross-section, such as by creating bends in the material to reflect radar signals downward or upward.

Background Projection

In some instances, background projection may be used as an alternative to ray-preserving cloaks.

Figure 4A:
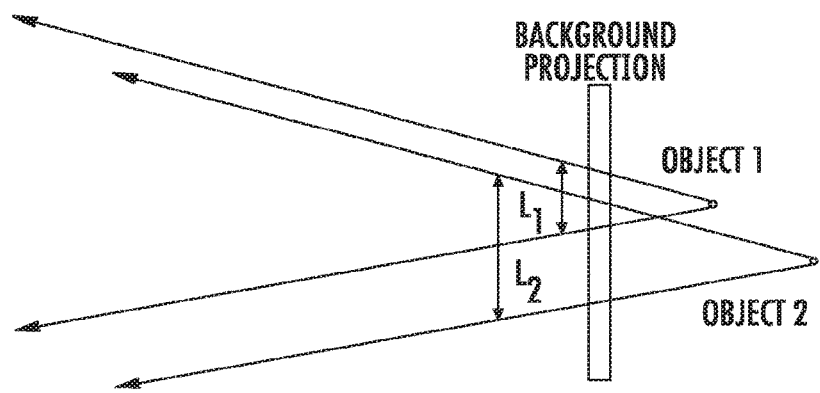
FIGS. 4A and 4B schematically illustrate an embodiment of a background projection system.

To understand the basic physics of background projection, consider FIG. 4A. FIG. 4A shows a couple of point objects that are in the background. From an observer in the distance, the background projection must display the point object on the screen that is in a straight line with the viewer's location. As the viewer moves relative to the projection and background, the projection may be configured to preserve the perceived position of the background object. For example, in FIG. 4A, Object 1 is closer to the screen than Object 2 and so the relative displacement of the projected object $L_1$ is smaller than $L_2$. In this example, and in other instances, the projected displacement is independent of the observer and depends only on the distance of the object from the projection.

Figure 4B:
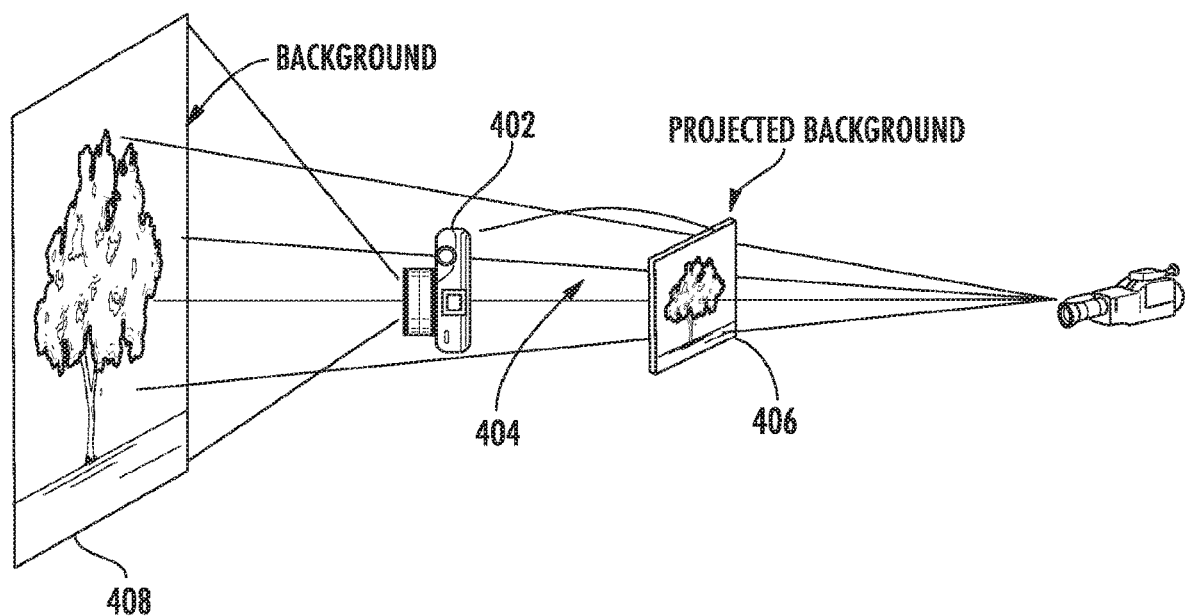
Figure 5A:
FIGS. 5A through 5E illustrate an example of image parsing for an embodiment of a background projection system.
Figure 5B:
Figure 5C:
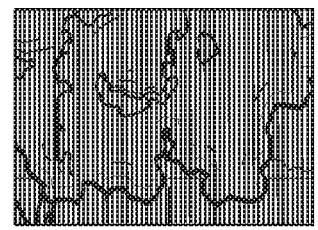
Figure 5D:
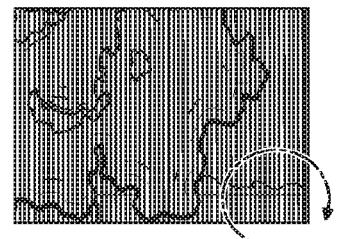
Figure 5E:
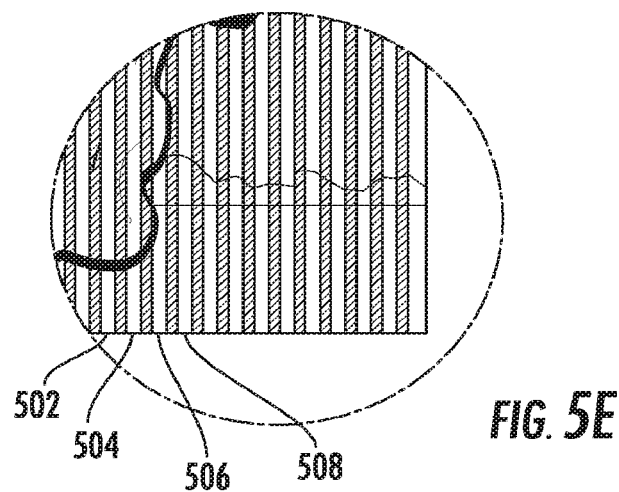

FIG. 4B shows an example of a background projection cloaking system. In some instances, such systems may be used to project uniformly "deep" backgrounds, such as a wall, or backgrounds including objects that have relatively small changes in depth relative to the distance of the objects from the projection (e.g. a tree that is relatively far away from the projected background, such as shown in FIG. 4B).

The cloaking system shown in FIG. 4B includes a light detector 402, a cloaking region 404, and a light emitter 406. The light detector 402 of FIG. 4B is a camera (e.g. a high spatial resolution digital camera), unlike the light detector 202 of FIG. 2 (which includes both a lens array 212 and a detector array 214). The camera 402 is configured to collect the background information 408 (e.g. a digital image of the background). As with the light emitter 206 of the FIG. 2 cloaking system, the light emitter 406 of the FIG. 4B cloaking system includes a lens array positioned over an emitter array. In the system of FIG. 4B, the light emitter 406 projects a portion of the background image that will change in appearance depending on the viewer's orientation relative to the light emitter 406.

In the FIG. 4B system, the background information (e.g. a high resolution digital image of the background) is parsed (such as by computer processing functionality) into several sub-images. FIG. 5 (*a*) shows one example of a background image, with FIGS. 5 (*b*)-(*d*) showing an example of parsed sub-images of the background image. As shown by FIGS. 5 (*b*)-(*d*), the sub-images may be overlapping. For example, each of FIGS. 5 (*b*)-(*d*) include the trunk of the tree from FIG. 5 (*a*), although the trunk is in a different position in each sub-image. FIG. 5 (*e*) shows an enlarged portion of the sub-image of FIG. 5 (*d*), showing that the sub-image may be divided into a series of vertical columns 502, 504, 506, 508, etc. In the embodiment shown in FIG. 5, the sub-images are each small portions of the scene from the background image, and, as shown in FIG. 4B, the solid area representing the cloaking region is smaller than the solid area subtended by the background scene. Each sub-image may reflect what an observer would see in the background from a particular view point. For example, one observer may see a particular portion of the tree in FIG. 5 (*a*) behind the cloaking device. The solid angle subtended by that portion of the tree must then be projected via the parsed image on the set of emission pixels associated for that observer. Another observer may see a different (although possibly partially overlapping) portion of the tree in the background, which must then have that portion projected for that direction.

Figure 6:
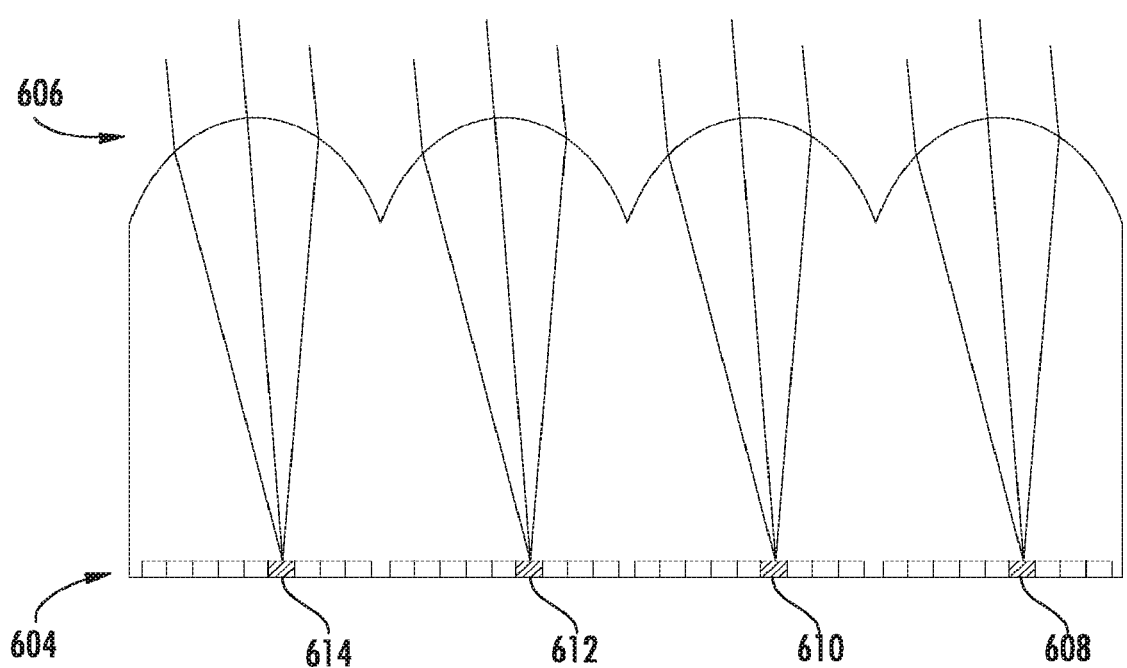
FIG. 6 schematically shows an example of a lenticular array over an emitter array.

Thus, in the system of FIG. 4B, the parsed sub-images may be used to create a projected background by the light emitter 406. FIG. 6 schematically shows a portion of one example of a light emitter that may be employed in the system of FIG. 4B. The light emitter of FIG. 6 includes an emitter array 604 beneath a lens array 606 (in this instance, a lenticular array of cylindrical lenses). FIG. 6 is a top down view of the light emitter, and, as such, the curved lenses of the lens array 606 each represent a vertical, cylindrical lens, and each pixel in the emitter array 604 each represents a vertical column of emitter pixels. In a similar manner to lenticular animation, columns from the sub-images may be interleaved and projected from columns of the emitter array 604, such that each one of the columns of the sub-images may be projected from a specific column of the emitter pixels. Each column of each sub-image is projected under only one lens of the lens array 606, with each of the sub-images corresponding to an image to be projected for a given direction to an observer. For example, column 502 from the sub-image of FIG. 5 (d) may be projected from emitter column 608 of the emitter array 604, column 504 may be projected from emitter column 610, column 506 may be projected from emitter column 612, and column 508 may be projected from emitter column 614. In a similar manner, columns from sub-images representing viewpoints adjacent to that of FIG. 5 (d) may be projected from columns adjacent to columns 608-614 of the emitter array 604. In other words, in this particular embodiment, there is one column from each sub-image per lens, and, since the projection pixels of the emitter array 604 are in the focal plane of the lens array 606, then the columns 608-614 have a unique direction associated with their emission, and a set of columns adjacent to columns 608-614 would have a slightly different direction associated with their emission.

In at least some embodiments, even though the projected background is made up of columned sub-images projected in different directions, the projected background will not appear to be dimmer than the actual background. When one looks at a standard projected image, the light is scattering from an emission pixel in a steradians. However, in at least some embodiments of the present invention, the light for a projected image under a lens arrays scatters in only in the desired direction and thus increases the flux to the observer. The higher the resolution of the emission array or the lower the pitch of the lenticular array, the more unique projections of the background there will be that can be observed on the cloak.

Figure 7:
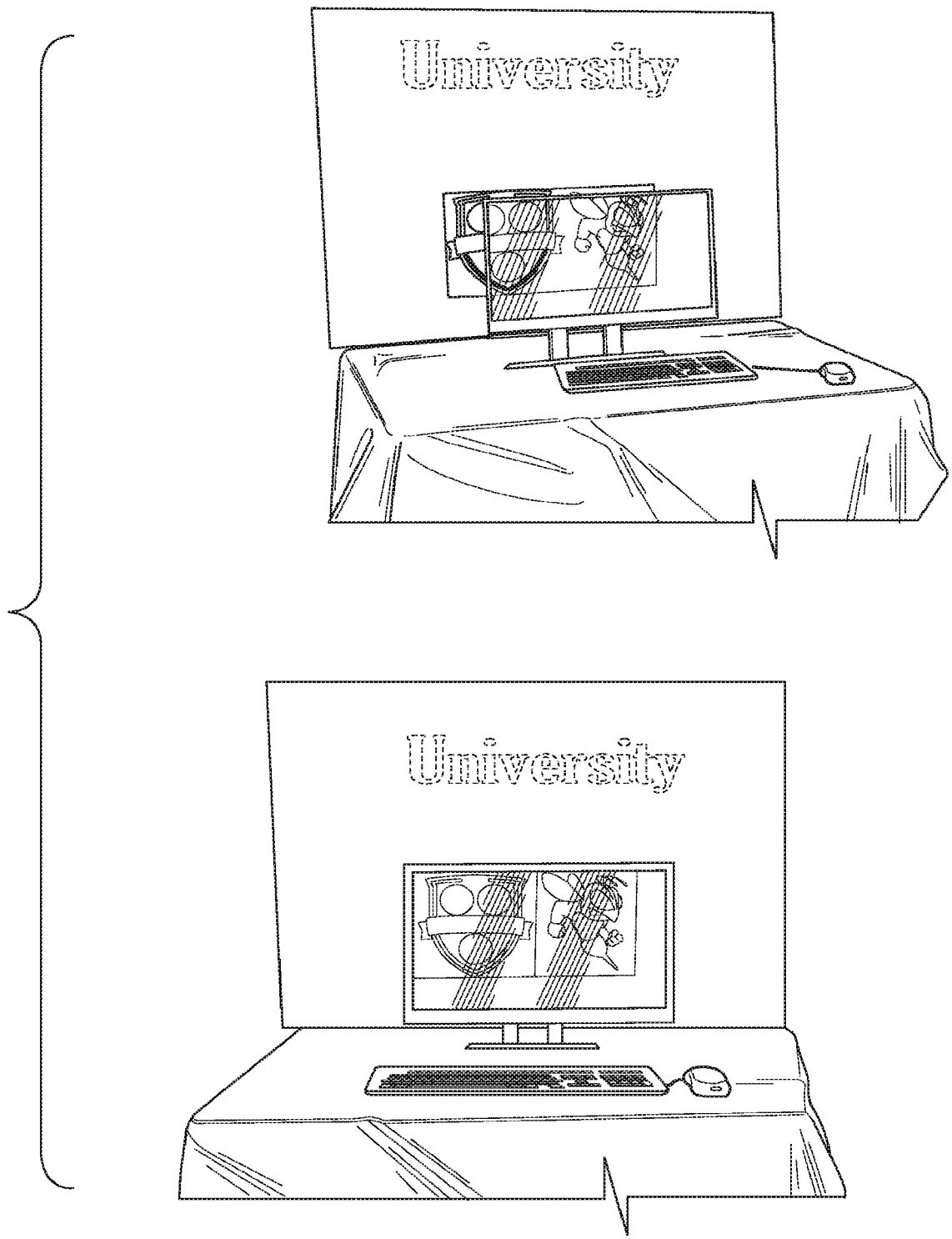
FIG. 7 shows an embodiment of a background projection system.

To demonstrate one non-limiting example of a background projection system, a 28-view lenticular lens array (10 lenses per inch) on top of an HD resolution 25" HP Pavilion 25bw monitor was used. The lenticular lenses were angled at 18.43 degrees relative to the vertical (3 to 1 slope). This allowed for sub-pixel interlacing (each color of the pixel is part of the interlace) and eliminates many of the fringing effects that can happen with pixel interlacing. The monitor had 1920 pixels on the horizontal with a 21.8 inch horizontal active area. Multiplying by 3 colors and dividing by Cos(ArcTan(1/3)) (owing to the slant to the lenses) and the number of lenses per inch yields 27.85 slanted pixels per lens or 28 views. The background image was loaded into a Mathematica program developed for creating sub-pixel interlacing. The horizontal RGB pixel values of the image were appropriately shifted upward by raising every red value up two spatial pixels, every green value up one spatial pixel and keeping the blue value fixed. The 28 views of the background were then placed on each of the diagonal pixels created within the lenses. Each view along each of the 28 diagonals then presents the image associated with a particular angle. It can be seen in FIG. 7 that in two of the 28 views the horizontal and vertical features of the image relative to the background have been preserved under horizontal translation over approximately 30 degrees. For objects that are close to the projection, the transition looks continuous.

Static Cloaking Systems

In some instances, the cloaking system may take the form of a static cloaking system. In one such example, collection optics may be used to acquire a scene, which may be printed in high resolution and applied to the back of a lens array (e.g. a lenticular array). A standard Epson printer, for example, can print images with up to 5760 dots per inch. Using a 60 lens per inch array, one can then have 96 unique directions for each lens giving both sub-mm resolution and near continuous changes of the scene as the observer moves relative to the cloaking system and background. In the case of a static system, one may use Integral Imaging, and, in some instances, may match the direction of the rays to the background as the observer moves relative to the cloaking system. In such an embodiment, the acquisition may be done where the emitter will be placed. In one example, the acquired scene may include several images captured from different positions or angles relative to a background to be used for the cloaking system.

To demonstrate an example of a static cloaking device according to the design outlined above, a sliding camera may be used to take video at 30 frames per second to acquire the scene. A lenticular lens array with 40 LPI and 18 views corresponding to 720 dots per inch from an Epson printer was used. To demonstrate the power of the technique in acquiring the image at one position and projecting it at another position, the image was acquired 16 inches away from the books, but the projection is 4 inches away while preserving the spatial and proper physics of relative motion for the background objects. By choosing the correct scan speed for the camera, one image per $40^{th}$ of an inch was collected. The 40 lpi 3D lenses have a viewing angle of approximately 18 degrees. It was determined that 18 degrees corresponded to approximately 500 pixels of the camera images. To project at a different distance than acquisition distance, 18 columns of pixels were chosen from every camera image and each column was interlaced under a unique lens. Each of those columns corresponded to a unique or about 1 degree of angular separation. This meant that every $28^{th}$ column of pixels ($\frac{1}{18}^{th}$ of 500 pixel columns) was used as a view and for this demonstration was placed 8 pixels away from the other view. Owing to the fact that this system example relies on trajectory preservation, the observer must be relatively far away (>2 m) to get a quality observation since the assumption is that the object is in the back focal plane implying the image is at infinity.

Figure 8A:
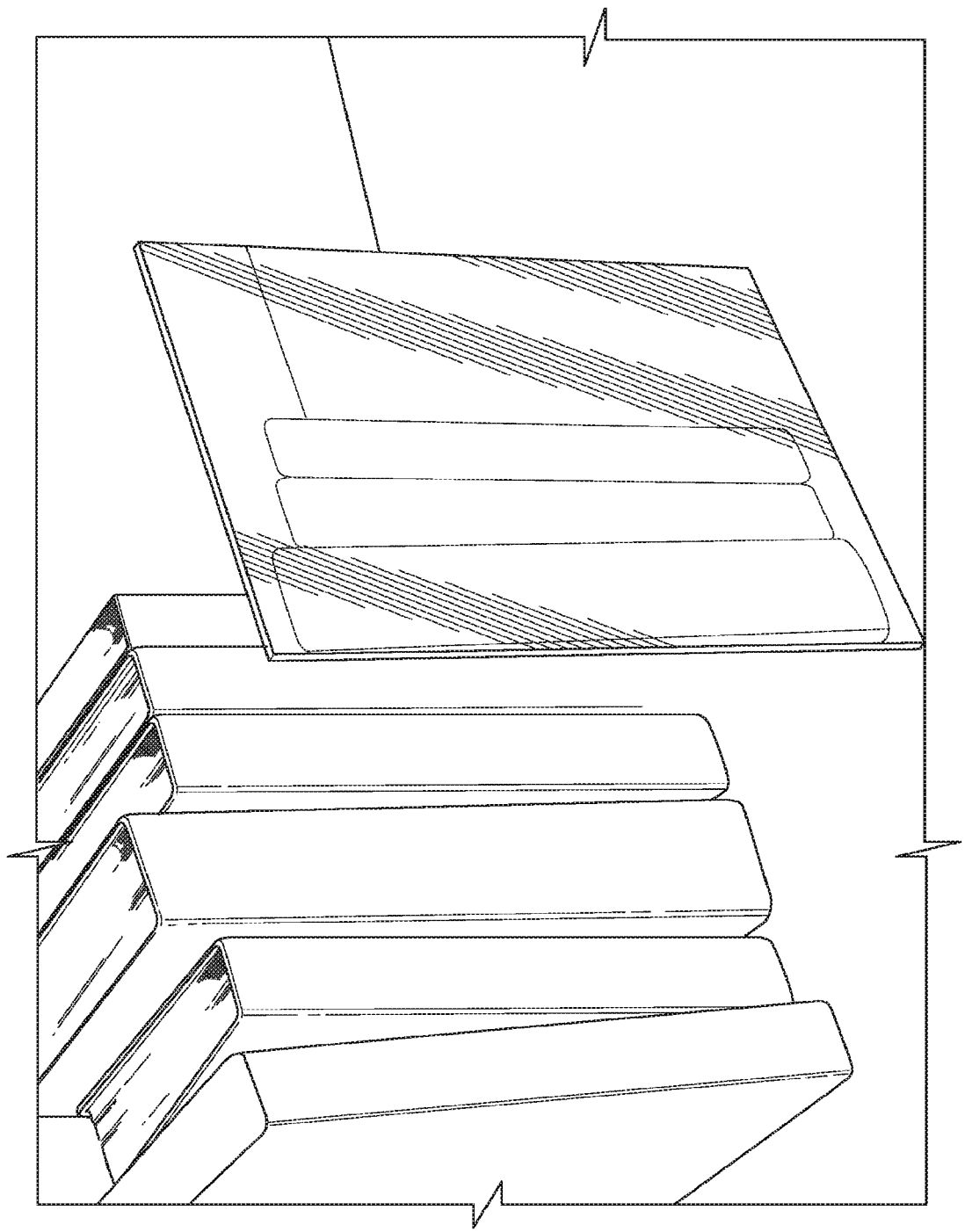
FIGS. 8A through 8C illustrate an example of a static cloak.
Figure 8B:
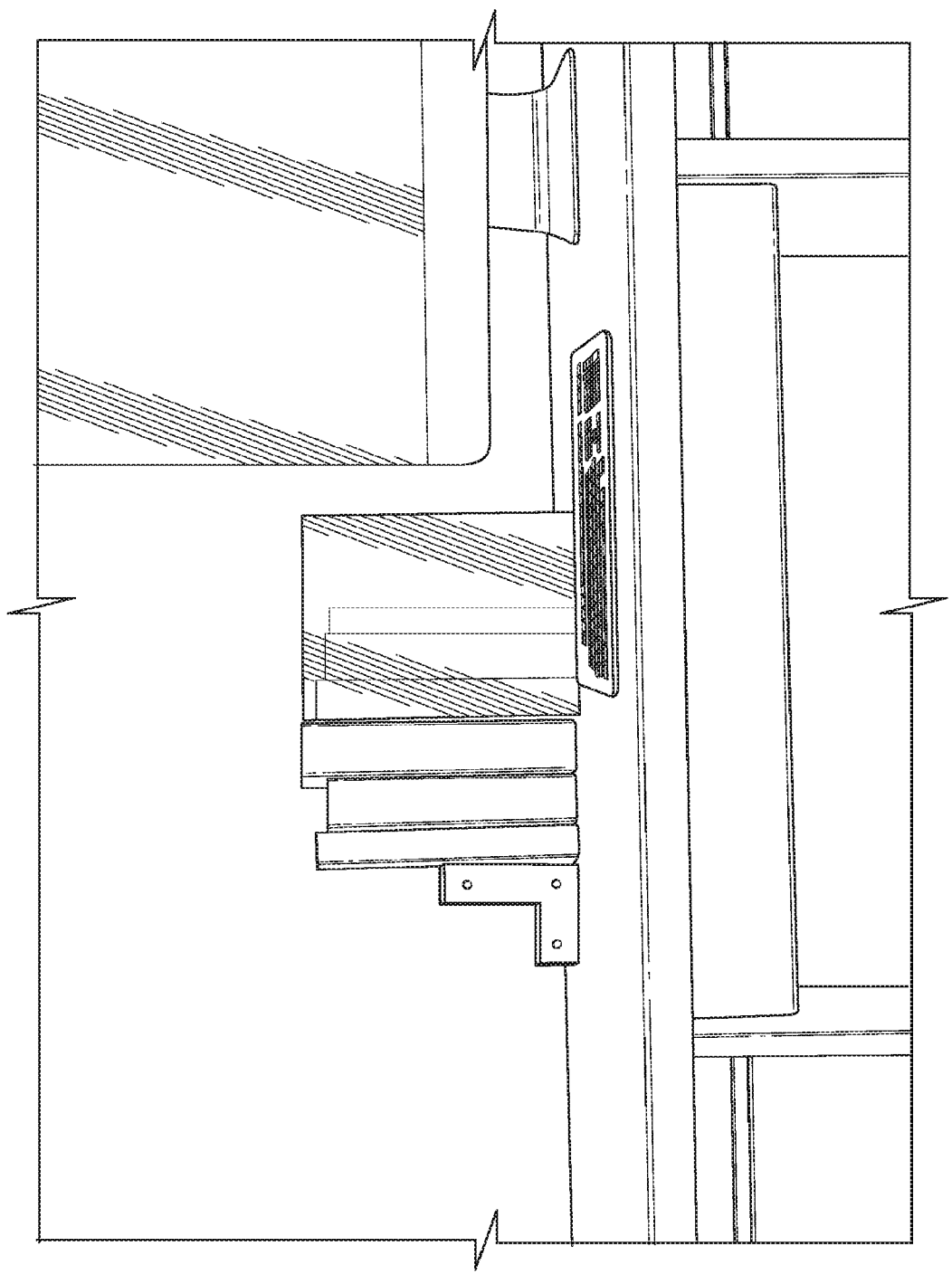
Figure 8C:
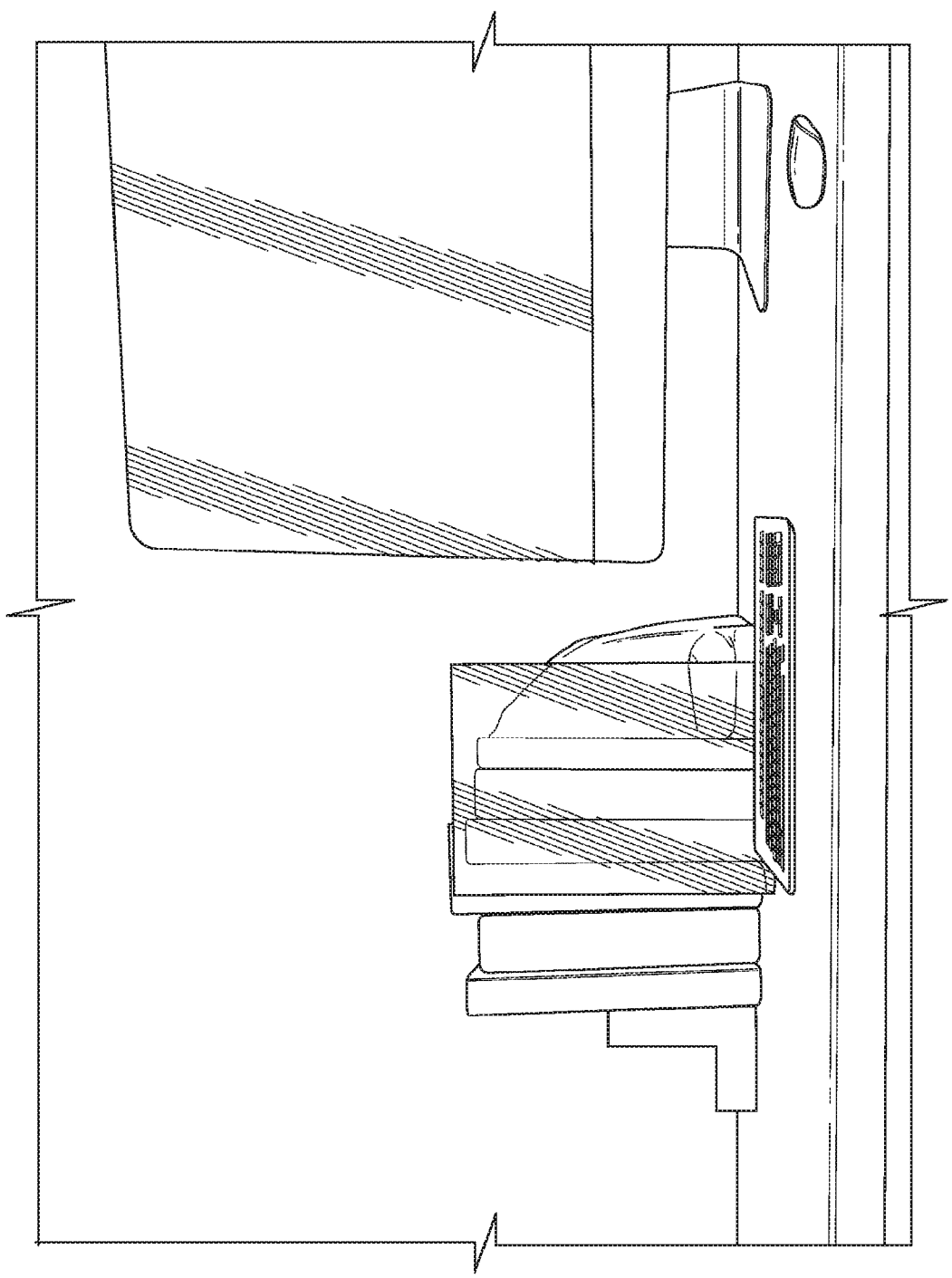

FIGS. 8A through 8C demonstrate another experimental example of a static cloaking system. This example used a 40 lens per inch lenticular lens array of 8×10 inches applied over a static image having a total of 320 spatial pixels horizontally. The lenses in this example allowed viewing over approximately 18 degrees and 18 views were used (thus, there was approximately 1 view per degree). To obtain the images for the static cloak, a camera slider was placed approximately 44 inches away from the intended position of the static cloak. The camera was then translated over approximately 14 inches to get the 18 degrees. The camera magnification settings were set so that the correct magnification yielded 320 total pixels over an 8 inch region at the distance of the cloak. This ensured that the cloaked area exactly matched the background at that point. This was done by placing an 8×10 frame at the future position of the cloak and observing that frame occupied 320 horizontal pixels. The camera was then scanned over the 14 inch region while recording HD video. The frames of the movie corresponding to every 14/18 of an inch (approximately 1 degree for a camera slider distance of 44 inches) were used as the views. This ensured that each view had the correct angle so that the directions of the views matched and gave the proper background physics motion. FIG. 8A shows the lenticular at an angle that reveals its relative displacement to the books, but does not cloak. FIGS. 8B and 8C show views of the lenticular from its extreme working angles. The stapler jutting from behind shows the cloaking effect.

Multiple-Depth Projection

Another method for acquiring the background information that can be projected after postprocessing is discussed in further detail below. In some embodiments, a multiple-depth cloak can be achieved in some instances using a 3D image capture. For example, this may be done with stereoscopes or LIDAR. Once one obtains a depth map, then one can determine a "length map" or the distance the projected object needs to move across the screen as a function of observer angle. As shown in FIG. 4A, the length is proportional to the depth (e.g. depth between the background projection and the object. For with maximum projection angles about the optical axis (e.g., 15 degrees to each side), the linear relation is L=2D tan (Θ/2). However, with a range of depths, then objects may compete for the same pixel for certain views. A hierarchy of projection may be beneficial in which the closer objects have priority for occluders and non-occluding objects, then a transparency level may be set.

It might be of interest to consider what the ultimate limits for projection are given currently available technology. Consider a reasonable set of parameters. Suppose, the cloak is configured to work over a 30 degree angle with each degree yielding a unique view. This would correspond to a 10 pixel wide sub-pixel interlace (30 views). Assuming that there are approximately 100 pixels per inch (assuming a monitor approximately 40 inches wide) on a 4 k ultra television, this would correspond to a 10 lenses-per-inch array. Since the human visual acuity is approximately 0.0003 radians, this means that the observer would only need to be approximately 10 meters away from the cloak before the observer could not ascertain spatial features with sufficient clarity to distinguish the parsed projection of the background from the background assuming colors are properly matched. These are somewhat remarkable results considering the close proximity of the observer to the cloak and the relatively high number of viewing angles. With this many viewing angles, the changes to the views appear continuous.

Discretized/Digital Cloaking

Invisibility cloaking makes the cloaked object appear transparent, as if the light fields exited the cloaked space without the object present [3, 10]. It is a form of illusion, where the light bends around the cloaked space, but re-forms afterwards to appear as if it had never bent. This allows both the cloaked object and the cloaking device to not only be hidden, but appear transparent.

With an ideal cloak (broadband, omnidirectional, 3D, phase-matching, etc.) a 'ray optics' approximation may be made, where the full phase of the electromagnetic field of light is not necessarily matched. For imaging, whether by camera or by the human eye, the phase is typically not detectable, which is why ray tracing is usually sufficient for designing imaging devices. Ray optics cloaking can be considered a discretization of spectrum and phase for a given ray, since its phase (modulo 2n) will match for one or more discrete frequencies, or discrete phase values can be matched for a given frequency. Ray optics alone significantly reduces the complexities of cloaking such that isotropic, off-the-shelf materials can be used to build macroscopic cloaks for small angles [10].

Figure 9A:
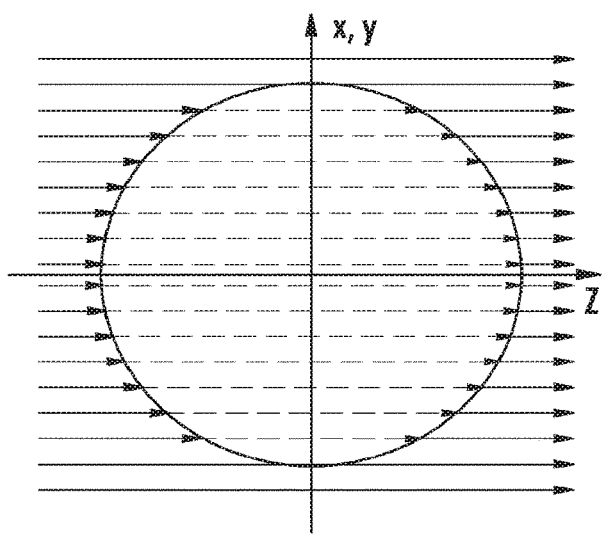
FIG. 9(a) shows an example of an ideal, spherically symmetric cloak.

FIG. 9(a) shows some rays that enter and exit an ideal, spherically symmetric cloak. Example rays (solid arrows) enter and exit the cloak (circle in 2D, sphere in 3D). Dashed arrows show how the rays appear to have traveled inside the cloak (where objects are invisible). Rotational symmetry (about z) is assumed, so only the cross-section of the spherical cloak is shown. For simplicity, only rays with one angle are shown, but due to spherical symmetry this implies that the cloak will work for all angles (omnidirectional). The dashed arrows show how the rays should appear to have traveled inside the cloak, which is to exit as if each ray propagated through the cloak in a straight line. In reality, the rays within the cloak should curve around an object or space, to make it invisible.

Figure 9B:
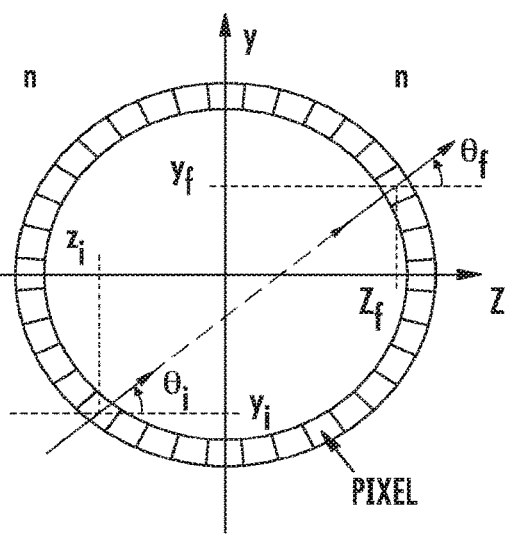
FIG. 9(b) shows an example of a discretized, symmetric cloak.

In the past, building an omnidirectional cloak has been elusive to demonstrate, even for ray optics. However, for practical usage, since detectors including the human eye have finite resolution, the appearance for omnidirectionality can be achieved by discretizing space and momentum (or angle). Given the finite resolution of detectors, such as the human eye, discretization can be unnoticeable. A rotationally symmetric example is shown in FIG. 9(b), where each discretization in space is a pixel. Solid arrows depict a ray of light entering and exiting. The surface of the cloak is discretized, so that each pixel in space can both detect and emit discrete ray positions and angles. This example of a digital cloak uses digital detection and display technologies for these discrete pixels. Each spatial pixel can be composed of separate subpixels that detect and/or display discrete ray angles. Additional subpixels may also be included for other ray characteristics. Discretized cloaking allows digital imaging and display technologies to be placed on the surface of the cloaked space to implement a digital cloak. In some instances, digital cloaking may discretize the spectrum of frequencies further than just the ray optics approximation. For example, some digital displays might only show red, green, and blue (RGB), so additional subpixels for discrete color may be desired.

Implementing a discretized cloak or a digital cloak involves propagating the rays from input to output correctly. This can be done using a paraxial cloaking matrix (Equation (1) of Ref [10]), since the final ABCD matrix is still valid outside of the paraxial (small-angle) regime. This is also shown in FIG. 9(b), where given a transverse position $y_i$, angle $\theta_i$, and longitudinal position $z_i$ of the input ray, the output ray is given by (with same variable names but with subfix 'f'):

$$\begin{bmatrix} y_f \\ n\tan\theta_f \end{bmatrix}_{z=z_f} = \begin{bmatrix} 1 & (z_f - z_i)/n \\ 0 & 1 \end{bmatrix} \begin{bmatrix} y_i \\ n\tan\theta_i \end{bmatrix}_{z=z_i}. \quad (1)$$

Rotational symmetry about the center axis (z) is assumed and the ambient medium has refractive index n. Note that each ray has its own longitudinal distance $L=(z_f-z_i)$ that is dependent on its input and output planes for the cloak. To be direct, the 'real' angle θ was used instead of the 'paraxial angle' u(=tan θ). Although FIG. 9(b) shows a cloak that is circular in 2D, or spherical in 3D, arbitrarily shaped discretized cloaks are possible. For cloaks with general shapes, Equation (1) can be applied for each 2D plane containing the z-axis and rotated about the z-axis.

For some implementations of the digital cloak, it may be useful to invert Equation (1):

$$\begin{cases} y_i = y_f - (z_f - z_i)\tan\theta_f, \\ \theta_i = \theta_f \end{cases} \quad (2)$$

Equation (2) shows how to find the detector pixel that should be used for the display pixel positioned at $y=y_f$, $z=z_f$. For example, one may first select detector subpixels that collect rays of the same angle ($\theta_i=\theta_f$), color, and any other desired attributes as the output ray. Out of these candidate subpixels, one may select the one that has transverse (y) position closest to $y_i$, and longitudinal (z) position closest to $z_i$, where $y_i$ and $z_i$ satisfy Equation (2). Graphically, one may extend the dotted arrow in FIG. 9(b) backward until it intersects the cloaking surface, and then find the closest matching subpixel nearest to that intersection.

Demonstration of an Integral Cloak

Figure 10A:
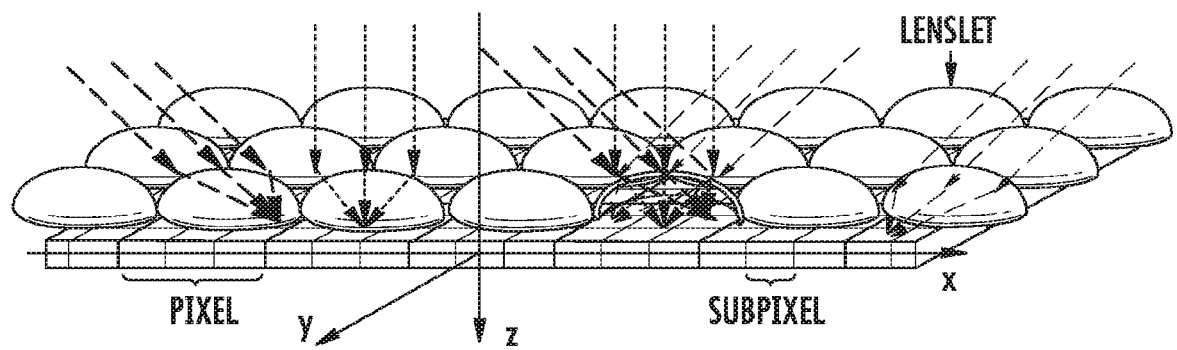
FIG. 10(a) shows an example of a fly's eye lens array.

The following are examples of digital, discretized cloaking devices that detect and reproduce proper ray positions and angles. One example of a way to achieve this is to utilize Shack-Hartmann wavefront sensors, or fly's eye lens arrays. These allow the position and momentum of rays to be captured by using arrays of small lenses, which can spatially separate rays of different angles (See FIG. 10(a)). FIG. 10(a) is a zoomed out portion of FIG. 10(b). A pixel collects rays with the same position as the lens. These rays are then spatially separated into subpixels, such that one ray angle (or 'view') maps to one subpixel. Display (output) is the reverse of detection scheme shown here. Each lenslet focuses these rays into its corresponding subpixel, placed at the focusing plane below. Different incident angles are then spatially separated into different subpixels. Lippmann had proposed photography using this concept in 1908, and attempted to demonstrate this integral photography with limited technology [14]. Resolution, depth of field, and limited viewing angles are typically drawbacks for such integral 3D displays, but improvements are being made [15]. In particular, with current commercial efforts to increase the pixel density of displays, resolution may be anticipated to improve continually. For cloaking, lens arrays on a display panel may be used to generate the desired ray output pattern according to Equation (1). The term "integral cloaking" is cloaking that uses integral imaging techniques and "digital integral cloaking" is integral cloaking that uses digital technology.

Figure 10B:
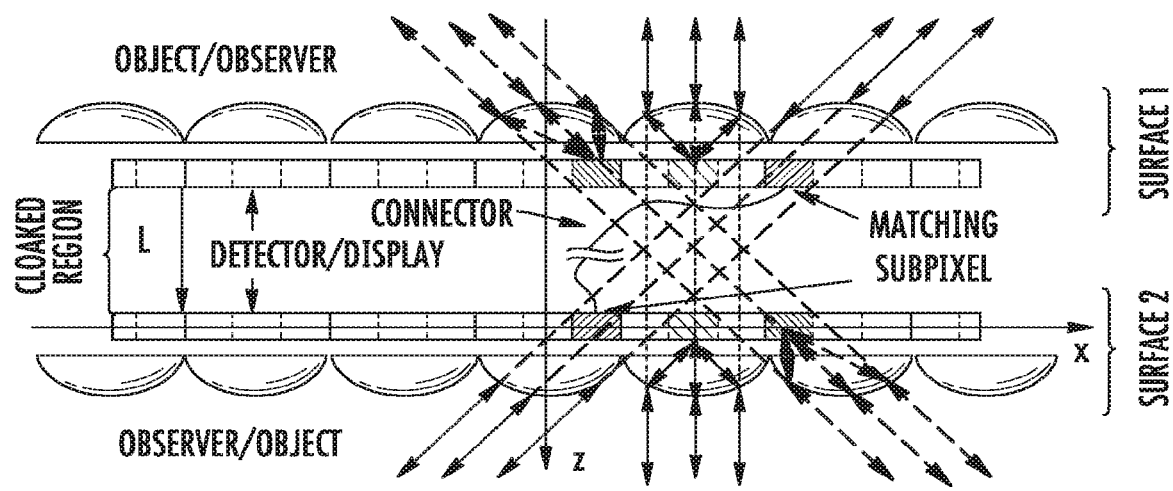
FIG. 10(b) shows an example of an integral cloak, showing a cross-section of two parallel, 2D plates and their lenslet arrays.

An example implementation of an integral cloaking using integral imaging techniques is shown in FIG. 10(b), where for simplicity, two parallel plates are used together with lenslet arrays. Each surface (lens array+plate) may be configured to capture light rays and display rays for cloaking. Displayed rays are output as if the rays entered one side and exited the other with nothing in between (dotted lines). Each matching subpixel pair is connected with a connector (wiring and/or computer). Each plate and lens combination may have two functions: to capture light rays and to display cloaking light rays. This can be done by placing both detector pixels and display pixels next to, or nearby each other, for example. The displayed light rays (output) use the incident rays from the other plate (input) according to Equation (1).

FIG. 10(b) is symmetric, where an observer can be in front of either side. However, for purposes of this particular example, rays may be captured with one plate and display the rays with the other, only. With parallel plates, $L=(z_f-z_i)$ is constant in Equation (1) for all rays. To simplify the required equipment in this example, the cloak may be limited to two-dimensional (2D) where the observers move only in the plane horizontal to the floor (x-z plane in FIG. 10(b)). Since both eyes of an observer typically lie on the same horizontal plane, stereoscopic depth can still be perceived with the 2D version. Integral cloaking in the vertical plane follows the same principles, just rotated, so that in algorithm and in theory, 2D cloaking extends to 3D in a straightforward manner.

Figure 11A:
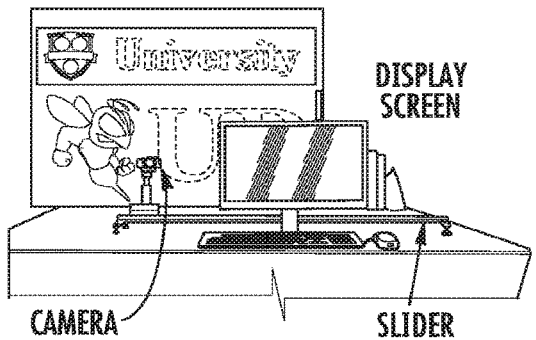
FIGS. 11(a) and (b) show an example of an integral cloak setup using cylindrical lenslet arrays (a 2D implementation is shown).
Figure 11B:
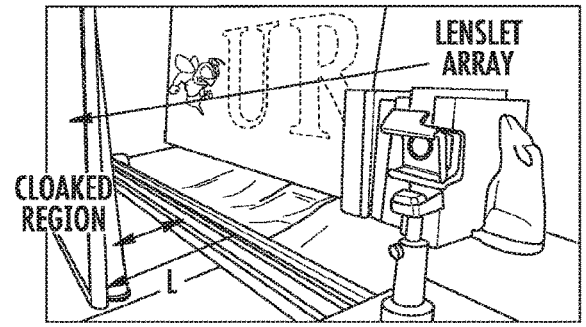
FIGS. 11(c)-(f) show a demonstration of the integral cloak of FIGS. 11(a) and (b), including screen shots by a camera that moved horizontally across the room.
Figure 11C:
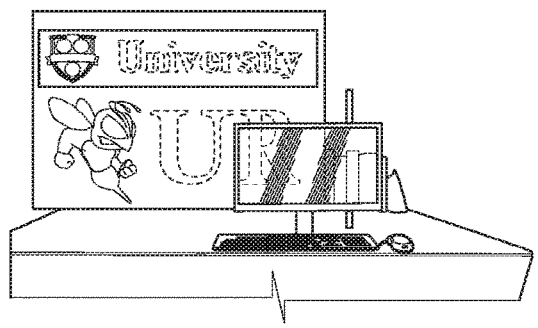
Figure 11D:
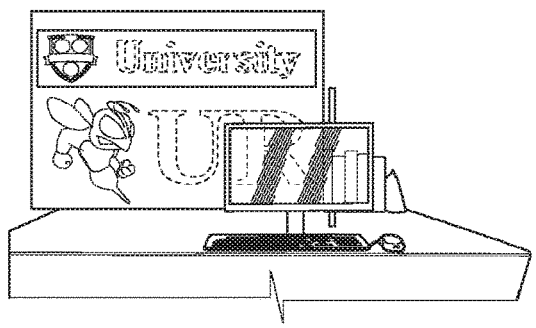
Figure 11E:
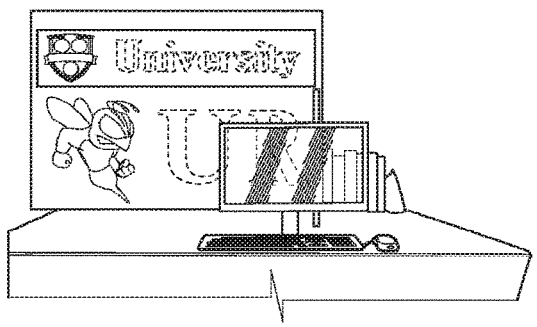
Figure 11F:
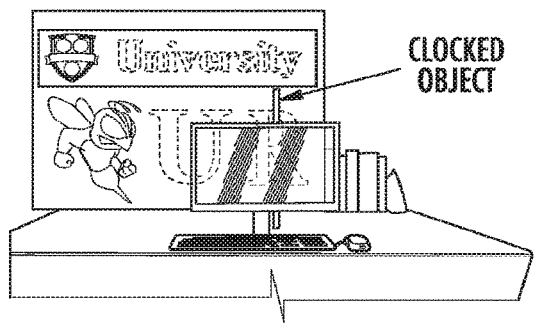

FIGS. 11(a) and 11(b) show the setup for one example of a 2D integral cloak. For the image capture (input) plane, a large field-of view camera was used, mounted on a mechanical slider that scans horizontally at a fixed speed. A camera on a slider (input plane) scans horizontally to gather input rays. The lenslet array on the display screen (output plane) emits rays according to Equation (1). The space between the input plane and output plane (separated by a distance L) is the cloaked space. Rays from the camera are processed by a computer that uses Equation (1) ('y' replaced by 'x') to determine the output rays for each display pixel. A 25 inch (diagonal) color monitor overlaid by a cylindrical lenslet array (10 lenses per inch) was used for the display (output) plane of the cloak. Both monitor and lenslet array were commercially available. By slanting the cylindrical lenses (at an angle of 3 pixels vertically down, 1 pixel horizontally across), the 3 RGB subpixels were used to gain 3 times the horizontal resolution, at the sacrifice of vertical resolution [15]. The particular combination of slanted lenslet array and display monitor generates 28 discrete views over ≈28° of viewing angles (field-of-view). Each view corresponds to the discrete ray angles/momentum that can be displayed for the system. The input plane (camera+slider) and display screen were separated by L≈9.5 inches (See FIG. 11(b)). The objects (books and poster) ranged from 8.5 inches to 12.5 inches away from the input plane. For a 3D integral cloak, a fly's eye lens with spherical lenses on a 2D plane will work, as suggested initially. The bottleneck for a 3D version will likely be the input plane, as raster scanning over the 2D (x-y) plane would be necessary if using a single camera. A faster method, though more costly, would be to use an array of detectors on a plane, combined with a fly's eye lenslet array, as initially shown in FIG. 10(b).

FIGS. 11(c)-(f) show a demonstration of this example of a 2D integral cloak. The displayed output on the screen horizontally aligns with the background objects (poster and books), as the observer (camera) moves left or right. A rod placed between the input and output planes is cloaked. A camera at a fixed height and distance from the cloak was placed on a slider to scan horizontally. This camera was about 120 inches from the display screen, and scanned a total distance of 38 inches. FIGS. 11(c)-(f) show ¾ of the total visualization, so correspond to about 13.5 range of viewing angles. The objects behind the cloak match in horizontal alignment and size (magnification) for varying depths of objects (from the cloak). The vertical magnification matches for a fixed observer distance and fixed object depth only, since this is a 2D cloak that uses cylindrical lenses. In this case, the object depth of the "UR" poster was matched for, so that its vertical size was matched from the observation point. However, if spherical fly's eye lenslet arrays are used for a full 3D integral cloak, the vertical alignment and magnification will match for varying object and observer distances. Although not shown in FIG. 11, for varying observer depths (changing z), the amount of background scene shown on the display screen of the cloak will vary, so as to appear as if the screen was not present.

Figure 12A:
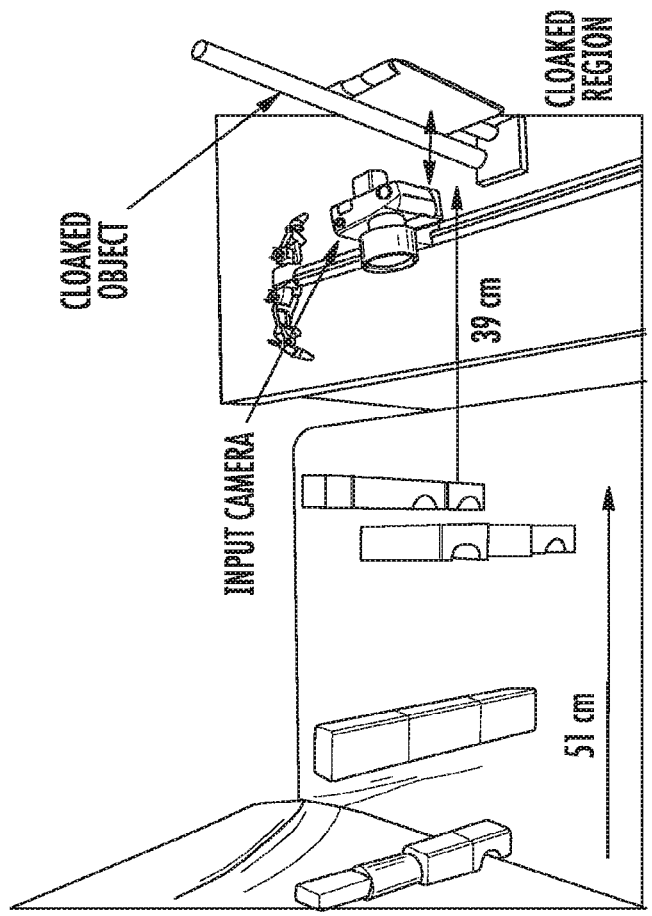
FIGS. 12(a)-(b) show an exemplary digital integral cloak setup according to some embodiments.
Figure 12B:
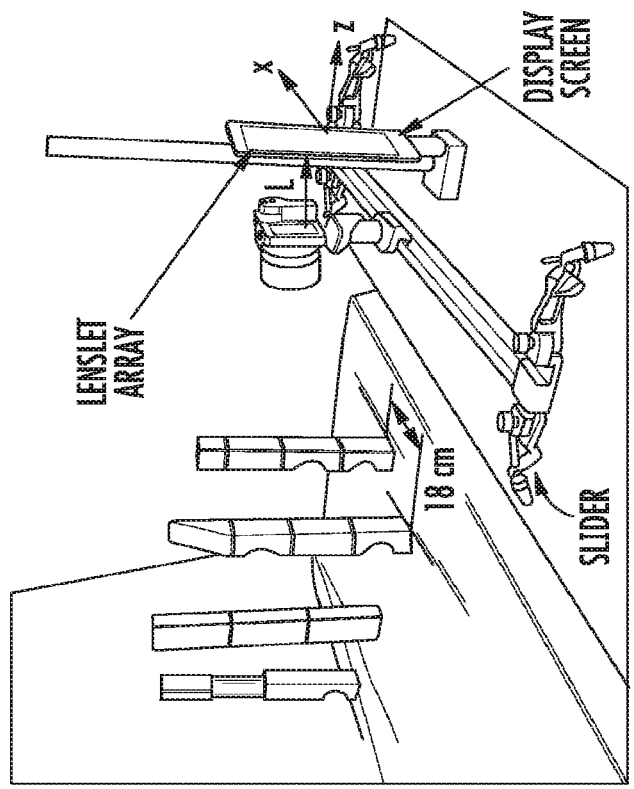

FIG. 12(a) and FIG. 12(b) show the setup for another 2D digital integral cloak according to some embodiments. The input plane (input camera sensor on slider) and display screen were separated by L=13 cm. The cloakable volume behind the active display screen was then ~2500 cm$^3$. The background objects include four sets of colored blocks, the total depth of the object space (from the input plane) being 90 cm. Rays from the input camera were propagated by a computer to the output.

For 2D, a scanning camera may improve performance in some embodiments compared to a combination of lenslet and detector arrays (input surface of FIG. 10(b)). The continuous scan by the scanning camera may give a horizontal spatial resolution of 0.106 mm in camera positions. This may be about 10 times better than the horizontal spatial resolution of a system which is limited by the output lenslet array. In addition, commercial cameras are highly aberration-corrected, whereas lenslet arrays usually have little, if any, corrections; so the former may provide sharper images, both for input and output. The benefits of the horizontal scanning method come may require additional time. For the setup (FIG. 12), the input scan took 29 seconds, and the computational processing took 22 seconds on the laptop that ran the code. Additional time may be necessary to test and transfer data, but with proper hardware interfacing, this can be automated with little delay. Both scan and processing times increase with the dimensions of the cloakable volume. For example, the horizontal scan distance required was (Ws+2L tan(FOV$_l$/2)). Here, Ws is the active screen width of the output display, and FOV$_l$ is the field-of-view (FOV) of the output lenslet array. Subjective quality requirements of the cloak can dictate the speed as well. A 3D version may be provided with raster scanning over a 2D (x-y) plane, which can be difficult and time-consuming, if using a single camera. Thus, for real-time or 3D digital cloaking, using a 2D array of detectors combined with a fly's eye lenslet array (FIG. 10(b)) for the input surface may be an alternative approach.

For the output display, a 20 cm (diagonal) LCD monitor (Apple iPad mini 4) was used. The output lenslet array is a 2D cylindrical lenslet array (20 lens-per-inch array from Micro Lens Technology). Both display monitor and lenslet array were commercially available. For a 3D integral cloak, a fly's eye lens array may be used to replace the cylindrical lenslet array. By slanting the cylindrical lenses, the 3 RGB subpixels were used to gain 3 times the horizontal angular resolution (in number of 'views'), at the sacrifice of vertical resolution [15]. The output system generated 51.5 discrete 'views' over 29° of viewing angles (field-of-view), horizontally. This 29° was the field-of-view of the lenslet array (FOV$_l$), and limited the cone of angles for both the output and input of the cloaking system, since the input camera field-of-view was larger) (~60°. Each 'view' may correspond to a discrete ray angle/momentum (one 'subpixel' in FIG. 10(a)) that is displayed for the system. This may determine the output angular resolution of the cloaking system, giving 0.56° between neighboring views. Note that this output 'angular resolution' of the digital integral cloak is how much an observer must move to see a change in image (corresponding to the subsequent 'view'). So smaller angular resolution values provide more continuous viewing, and allow farther observation distances, than larger values.

Figure 12C:
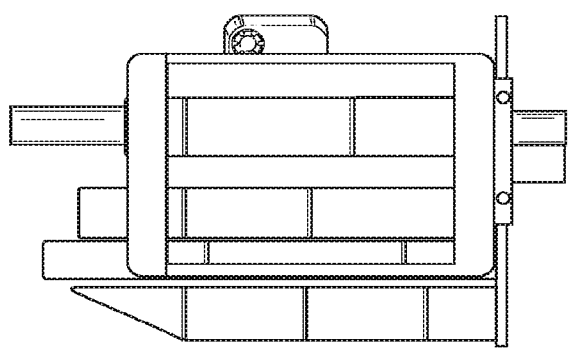
FIGS. 12(c)-(f) show exemplary screen shots from an observer camera that is moved horizontally in front of the cloak.
Figure 12C:
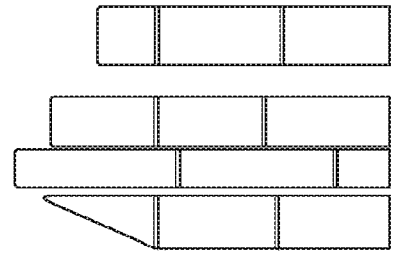
Figure 12D:
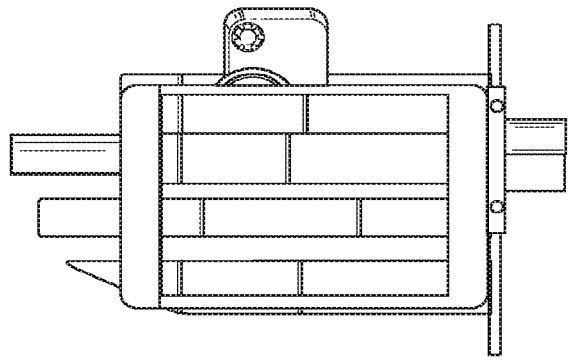
Figure 12D:
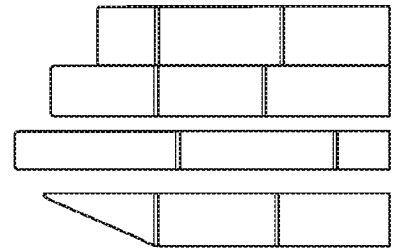
Figure 12E:
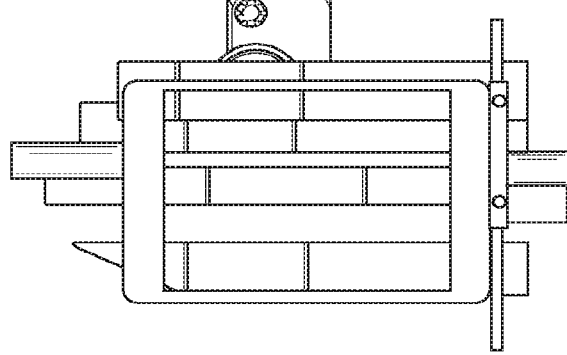
Figure 12E:
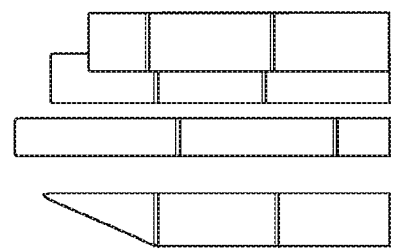
Figure 12F:
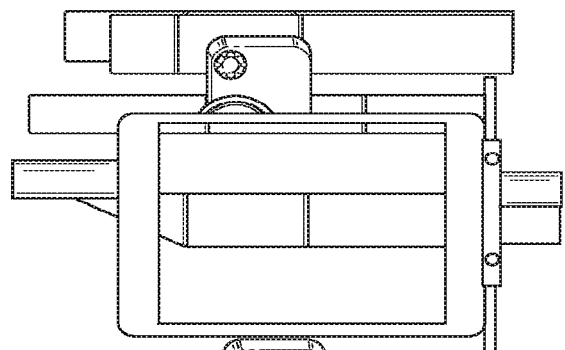
Figure 12F:
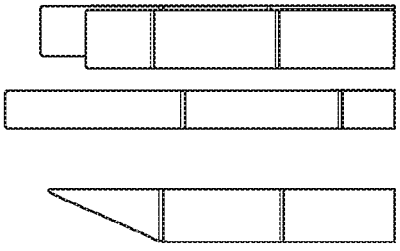

FIGS. 12(c)-(f) show a horizontal (x) demonstration of this 2D digital integral cloak. An "observer" camera at a fixed height (y) near the center of the cloak, and fixed distance z from the cloak, was placed on a slider to scan horizontally (x). This camera was 260 cm from the display screen (cloak). FIGS. 12(c)-(f) show 10.8° of the total 13.4° viewing range. The objects behind the cloak match in horizontal alignment, size (magnification), and parallax motion for varying object depths (from the cloak). As expected for real 3D scenery, the objects that are farther from the screen move across the cloaking screen quicker than those closer to the screen. In FIG. 12(c) the viewing angle from screen center to observer camera was −4.1°. In FIG. 12(d) the viewing angle from the screen center to observer camera was 0.0°. In FIG. 12(e) the viewing angle from screen center to observer camera was 2.0°. In FIG. 12(d) the viewing angle from screen center to observer camera was 6.7°. FIGS. 12(c')-(f) show the blocks at the same viewing angles as FIGS. 12(c)-(f) without the cloak. The cloaking screen, demonstrated in FIGS. 12(c)-(f), horizontally matches (c')-(f) respectively, in size, alignment, and parallax motion.

The vertical magnification was matched for a particular observer distance and object depth combination, since this was a 2D cloak with cylindrical lenses. In this case, from the observation distances used in FIGS. 12(c)-(f), the vertical sizes of objects near the farthest blocks (dark green) and red blocks were roughly matched. If spherical fly's eye lenslet arrays are used for a full 3D integral cloak, the vertical alignment and magnification can match for all object and observer distances.

FIGS. 13(a)-(d) show a longitudinal (z) demonstration of the digital integral cloak, by varying observation distances away from the cloaking screen. The observer (camera) at different distances in front of the display screen of the cloak: 272 cm, 235 cm, 203 cm, and 150 cm, for (a)-(d), respectively. The cloak displays more of the background objects, spatially, for closer observation. The horizontal field-of-view occupied by the cloaking screen, from the observer camera, were 2.53°, 2.93°, 3.38°, 4.59°, for FIGS. 13(a)-(d), respectively. This is the range of angles ('views') of the light rays that the observer camera captures. As an observer moves closer to the cloak (from FIG. 13(a) to FIG. 13(d)), a larger range of angles is seen. This corresponds to a larger spatial amount of the background scene being shown by the cloak (horizontally). For a cloaking system, which should appear as if absent (transparent), this is as expected.

Finally, the digital integral cloak was characterized with additional quality metrics. Since the exemplary digital integral cloak was a 2D demonstration, the analysis was limited to the horizontal (x) and longitudinal (z) dimensions. The horizontal input angular resolution for the system was 0.031°, which corresponds to the uncertainty in the input ray angles. (Recall the output angular resolution was 0.56°.) To provide sufficient depth-of-field, the input camera was stopped-down to f-number=f/10. The resulting input aperture diameter was then 0.88 mm (effective lenslet diameter in FIG. 10(a)). This corresponds to the range of transverse spatial positions, of the objects, that are captured for each detector pixel of the input camera. Comparatively, the output aperture was 1.34 mm. The demonstrated depth-of-field was over 60 cm, such that all the objects demonstrated for the cloak (FIGS. 12 and 13) were at least in good focus when collected for input. The input camera was not the limiting factor here, as several meters depth-of-field could be achieved, but the display (output) surface limited the resolution to display object depths clearly. The spatial sensitivity of the slanted lenslet array to be misaligned on the display is such that a 0.026 mm change in position will shift the 'view' seen. The angular sensitivity of the lenslet array alignment with respect to the display screen pixels was $(8.8 \times 10^{-3})°$.

Experimental Setup

For the image capture (input) plane, a digital camera (Sony DSC-RX10) was used, mounted on a mechanical slider that scans horizontally at a fixed speed. Each camera frame represented a single lenslet and pixel (of the input surface in FIG. 10(b)) located at the instantaneous camera position $(x_i,y_i)$. The camera image pixels may correspond to the detector subpixels, shown in FIG. 10(a). From the camera field-of-view, the input ray angles $(\theta_i)$ may then be calculated for these subpixels. Knowing the input ray position and angle, a computer may then be used to propagate the ray to the correct output subpixel using Equation (1).

The output plane may be parallel to the input plane and the two planes may be separated by a distance L. The background objects included four sets of colored blocks with the dimensions shown in Table S1.

TABLE S1

Object dimensions. Distance is from the input plane to the center of the objects, depth is the longitudinal (z) dimension, width is the horizontal (x) dimension, and height is the vertical (y) dimension. (All length units are in cm.)

| Objects | Distance | Depth | Width | Height |
|---|---|---|---|---|
| Back wall (w/black cover) | 98 | | | |
| Dark green blocks | 87.6 | 3.8 | 3.8 | 33 |
| Red blocks | 70 | 5.7 | 2.5 | 35 |
| Lime green blocks | 47 | 3.8 | 3.8 | 33 |
| Yellow blocks | 40.6 | 3.8 | 3.8 | 29 |

For horizontal (x) separations between the blocks, the farthest sides of the dark green blocks and the red blocks were 9 cm apart, and the farthest sides of the lime green blocks and the yellow blocks were 18 cm apart. The blocks, from the back side of the dark green blocks to the front side of the yellow blocks, spanned a total depth of about 51 cm. The distance from the front face of the yellow blocks to the camera sensor at the input plane was 39 cm.

The Sony DSCRX10 had a 1 inch 20.2 MP Exmor sensor for low lighting, and a f/2.8 Carl Zeiss Vario-Sonnar T*24-200 mmlens with 8.3× optical zoom. It was mounted on a mechanical slider (from Varavon) that scans horizontally at a fixed speed, which can be adjusted. 18.5 cm of travel was used for this setup. Here, Ws=12 cm was the active screen width of the display (Apple iPad mini 4), and $FOV_f=29$ degree was the field-of-view (FOV) of the output lenslet array (20 cylindrical lens-per-inch array from Micro Lens Technology).

Figure 14B:
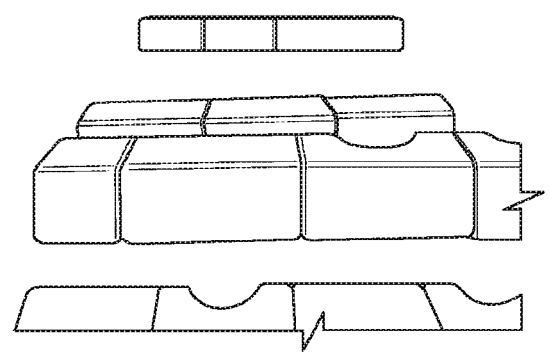
FIGS. 14 (a)-(b) show exemplary input scan video frames.
Figure 14A:
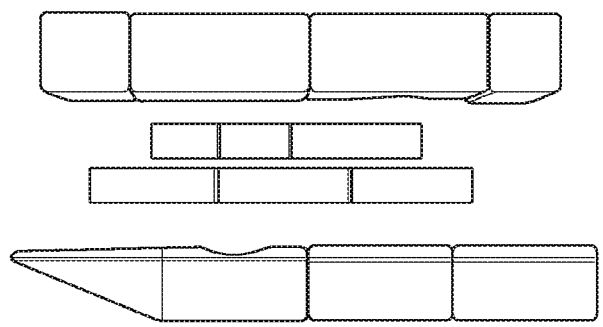

FIGS. 14(a)-(b) show some of the images from a scan by the input camera (Sony DSC-RX10), which was used for generating the cloaked image (FIGS. 12(c)-(f)). With this input scan, 60 frames per second were captured, while scanning at 6.35 mm/s. The input camera was focused at infinity, zoomed completely out (giving maximum spatial view), and stopped down to f/10. The field-of-view for the camera was measured to be about 60 degree and 33 degree for the horizontal and vertical dimensions, respectively.

Ray Propagation Processing

The propagation of rays over a finite distance is a characteristic of a cloak. After collecting the images from the input video scan, the video frames were processed using a code (written in C++) on a laptop (Lenovo Thinkpad W540).

Steps to Propagate Rays

Each input video frame was assigned an input ray position $x_i$, that is given by the position of the input camera at the time the frame was captured. Each 'view' represents an input ray angle $\theta_i$, which corresponded to a horizontal pixel position of the input video frame. Each valid input ray was then propagated using Equation (1) with $(z_f-z_i) \to L$, while assuming ambient air (n=1). If the calculated output ray fell on a valid display pixel (e.g., an RGB subpixel), then the image pixel information for this input ray was mapped to the output display pixel. This then completed the ray propagation for the cloak.

Inverting Propagation

As set forth above, for digital cloaking, it may be useful to invert Equation (1) to equation (2). Equation (2) shows how to find the detector pixel that should be used for the display pixel positioned at $y=y_f, z=z_f$.

Vertical Scaling

Since the demonstration was a 2D cloak that used cylindrical lenses, the vertical pixel positions of the background objects were fixed. This implies that the vertical size, or magnification, relative to the screen size will be constant, even if the observer changes position only in the 2D x-z plane. However, at least the vertical magnification can be matched for a particular observer distance and object depth combination. For example, for the demonstrations shown in FIGS. 12 and 13, the software may match the vertical size of objects that were 65.4 cm from the input plane (in the +z direction), which corresponded roughly to the middle of all four sets of blocks. This object plane would then theoretically match in vertical size when an observer was 185.4 cm from the output plane (in the +z direction).

Output Surface—Output Display

The output display monitor used was an Apple iPad mini 4. The display was an LED-backlit LCD monitor, with an active screen size of 20 cm (=7.9 inch) in the diagonal direction. The display pixel size was 2048×1536 resolution, at 326 pixels-per-inch (PPI). The display pixels were assumed to be square pixels, which was a fairly good assumption. This gives a width of 12.0 cm, and a height of 16.0 cm for the active screen size, in portrait mode. The 3 RGB (Red, Green, Blue) subpixels that made up a display pixel, were long in the vertical direction and short in the horizontal direction when the iPad mini was in portrait mode.

Output Surface—Output Lenslet Array

The 20 cylindrical lens-per-inch array from Micro Lens Technology used was a very thin (0.41 mm) sheet of plano-convex lenses. This was so manual adjustment of the separation distance between the lenslet array and the display screen was possible. The lenslet array was mounted on a transparent glass that was 2.3 mm thick, using the adhesive layer on the flat side of the lenslet array. The distance between the lenslet array and the screen was adjusted so that the LCD screen pixels lied at the back focal plane of the lenslet array. The field-of-view of the output lenslet array $(FOV_f)$ given by the manufacturer was 29 degree.

Output Surface—Slanted RGB Subpixel Imaging

The cylindrical lenses of the output lenslet array were slanted at an angle of 3 pixels vertically down, 1 pixel horizontally across. This then uses the 3 RGB subpixels of the display to gain 3 times the horizontal angular resolution (in number of 'views'), at the sacrifice of vertical resolution. The particular combination of slanted lenslet array and display monitor generated 51.5 discrete 'views' over 29 degree of viewing angles (field-of-view). With this slanted setup, the total number of views $(DimViewX_s)$, for a given display monitor and lenslet array combination, is given by:

$$DimViewX_s = \sqrt{10} \cdot \frac{PPI}{LPI}. \quad (3)$$

PPI (pixels-per-inch) is the pixel density of the display monitor, and LPI (lens-per-inch) is the lens density of the cylindrical lenslet array used. Equation (3) assumes that the display pixels are uniform and square in dimension.

Horizontal (x) Demonstration

The details for the horizontal demonstration shown in FIGS. 12(c)-(f) are now given. The "observer" camera (Nikon D3200) was 260 cm (along +z) from the display screen (cloak), and scanned a total distance of 61.4 cm (along −x). Viewing angles are positive when the observer camera is to the right (x>0) of the cloak/display, when facing the display screen as shown in FIGS. 12(c)-(f).

Longitudinal (z) Demonstration

FIGS. 13(a)-(d) showed images from varying observer positions (z=272 cm, 235 cm, 203 cm, and 150 cm, for FIGS. 13(a)-(d), respectively, for the display screen located at z=0). These positions then collect varying ranges of angles (or 'views') from the light rays emitted by the output cloaking display screen. Assuming that the center of the observer/camera aligns with the center of the cloaking screen, the range of horizontal (x) angles collected (FOV $x_{observer}$) can be calculated as:

$$FOVx_{observer} = 2\arctan\left(\frac{\frac{W_s}{2}}{z_{obs}}\right), \quad (4)$$

where $W_s$ is the horizontal width of the output display screen of the cloak, and $z_{obs}$ is the longitudinal distance of the observer from the output screen (the output plane, which is set to z=0). The resulting $FOVx_{observer}$ values were then 2.53°, 2.93°, 3.38°, 4.59°, for FIGS. 13(a)-(d), respectively.

The images shown in FIGS. 13(a)-(d) were cropped, but maintained the same pixel size as each other, just like the original images. The observer camera for these images used a tripod to maintain the same height (y), while varying the longitudinal distance z. Note that the centers of the camera and the screen should align for Equation (4) to be correct. However, for the small $FOVx_{observer}$ values as given in FIGS. 13(a)-(d), the range of angles should closely match to the calculated values given.

Characterization Metrics

Details of some of the calculations made in the main text are presented below, for the metrics that were used to characterize the digital integral cloak. Since the exemplary cloak was a 2D demonstration, the analysis is limited to the horizontal (x) and longitudinal (z) dimensions.

A. Output Surface Metrics

A.1. Output Spatial Resolution

The limiting spatial resolution of the cloaking system was given by the output lenslet array. The spatial resolution then can simply be calculated by inverting the lens per length value of the lenslet array. So for the 20 lens-per-inch (LPI) lenslet array used, the spatial resolution is given by 1.27 mm=1/(20 lens/inch). This is the width of a single lens of the output lenslet array. However, this is true only if the cylindrical lenslet arrays were not slanted at an angle. Since RGB subpixel interlacing was used, the lenslet array was slanted at an angle of 1 pixel across (horizontally) to 3 pixels down (vertically). The corrected horizontal spatial resolution ($dX'_s$ in inches) is then given by $$dX'_s = \frac{1}{LPI} \cdot \frac{\sqrt{10}}{3}. \quad (5)$$

The limiting spatial resolution of the exemplary cloak, calculated from Equation (5), is then 0.0527 inch=1.34 mm.

A.2. Output Display Pixel Spacing

The output display monitor (iPad mini 4) had a pixel density of 326 pixels-per-inch (PPI). So the pixel spacing resolution (horizontal or vertical) of the output display is 0.078 mm. Since RGB subpixel interlacing was used, the 3 RGB subpixels were actually used, giving a finer spatial resolution of 0.078/3 mm=0.026 mm per RGB subpixel.

This small pixel resolution was used in calculating the propagated ray positions (Equation (1)) more precisely than the spatial resolution of the lenslet array (Equation (5)), for the exemplary cloaking demonstration. However, using the spatial resolution in Equation (5) also seemed to provide similar images, likely due to the relatively small spacing of both values compared to the observation distances.

A.3. Output Angular Resolution

The limiting angular resolution of our cloaking system was given by the output surface (display+lenslet array). The angular resolution ($d\theta_0$) is simply:

$$d\theta_0 = \frac{FOV_l}{DimViewX_s}. \quad (6)$$

$FOV_l$ is the field-of-view (FOV) of the lenslet array, and $DimViewX_s$ is the total number of views from Equation (3). For the exemplary digital integral cloak, $d\theta_0$=0.56°.

B. Input Surface Metrics

B.1. Ideal Input System

First, the quality of input rays captured rely on the ability to separate position and angle (momentum) precisely, with no cross-talk. This is done by focusing the input camera to infinity (see FIG. 10(a)) and 'stopping down' the aperture. The sum effect of these two steps is that a single input ray (with fixed input position and angle) is mapped to a single detector pixel.

B.2. Input Spatial Resolution

For the input scan, 60 frames per second were captured, while scanning at 6.35 mm/s. This high frame rate and slow scan gave a horizontal spatial resolution ($dX_c$) of 0.106 mm for the spacing between input camera positions:

$$dX_c = \frac{v_{scan-s}}{FPS_c}. \quad (7)$$

Here, $v_{scan-s}$ is the speed of the scan in units of (length/second), and $FPS_c$ is the frame-per-second frame rate of the input camera.

B.3. Input Angular Resolution

Focusing to infinity maps the same ray angles to the same detector pixels of the input camera. Hence the input ray angles are then limited by both the aberrations of the camera and the detector pixels. With a highly aberration-corrected Carl Zeiss lens, aberrations were assumed to be minimal. Then the horizontal input angular resolution ($d\theta_i$) is given by $$d\theta_i = \frac{FOV_c}{DimX_f}, \quad (8)$$

where $FOV_c$ is the horizontal field-of-view of the input camera, and $DimX_f$ is the total number of horizontal pixels for the input video frame. $d\theta_i$ corresponds to the uncertainty in the input ray angles. For the exemplary cloak, $d\theta_i \sim 60$ degree/1920=0.031 degree.

B.4. Input Aperture

Next, to ensure that each transverse object position was mapped to separate detector pixels the aperture of the input camera may be 'stopped down'. Doing so decreases the aperture size, reducing the transverse (x, y) spatial extent of the rays that are captured by the input camera. Otherwise, blurring of the input images occur, i.e., a reduced depth-of-field results. It is well known in optics and photography that smaller 'f-numbers' (=focal length/aperture size) or reduced aperture size, improves the depth-of-field, which is how clear ('in-focus') the objects appear. Ideally, the aperture size should be infinitely small, but then the amount of light entering is infinitely small, too. So this was balanced by using an f-number (f/#)=f/10.

With the input f/#, the diameter of the input aperture stop ($CA_i$) used may be calculated:

$$CA_i = \frac{f}{f/\#}. \quad (9)$$

Here, f is the focal length used. The specifications for the Sony DSC-RX10 input camera stated the focal length range to be f=8.8-73.3 mm. Since the camera was zoomed all the way out, f=8.8 mm. This then gives an input aperture size $CA_i$=0.88 mm. $CA_i$ gives roughly the range of transverse spatial positions of the objects that are captured for each detector pixel of the input camera. This is particularly true when the lens is focused to objects at infinity, since only a single collimated ray bundle will enter the lens and be focused onto a single detector pixel (ignoring diffraction and aberrations). So $CA_i$ in this way is proportional to the blurring of objects in the input images.

The number to compare to $CA_i$ would be the aperture set by the output surface, which is given by the spacing of a single lens in the output lenslet array (1.34 mm), or the output spatial resolution (Equation (5)). Again, the output lenslet array can be seen to be the limiting element for spatial resolution and blurring of objects in the cloak. It is worth noting that $CA_i$ is different than the positional uncertainty of the input camera; the latter is the uncertainty for each input ray position, and is given by the input spatial resolution (Equation (7)) of the camera scan determined earlier (0.106 mm).

B.5. Input Depth of Field

The depth-of-field of the exemplary input system is discussed briefly. FIG. 14 shows differently timed snapshots of the input scan used for the cloaking system. Large depth-of-field of the input scan is demonstrated, with objects from 39 cm to 98 cm (back wall) from the camera (input plane). All the blocks can be seen, even the groove lines in the white wall, and the patterns on the back wall are in good focus. Again, the input camera was not the limiting factor for the exemplary cloaking system, as several meters of depth-of-field were achieved easily, but the display (output) surface limited both the spatial and angular resolutions, and hence also what object depths that could be shown clearly.

C. Other System Metrics

C.1. Sensitivity to Misalignment

Misalignment in hardware setup and imprecise propagation calculations can reduce the cloak quality. These can physically be manifested in skewed angles, shifts in object positions, or mismatching speeds of object movements as seen on the cloak, when compared to the actual background without the cloak. The demonstrated system seemed to be most sensitive at the output surface. This is mainly due to the high pixel density (326 pixels-per-inch) of the output display. So the horizontal spatial sensitivity ($dx_{mis}$) of an unslanted lenslet array to be misaligned on the display is such that a 0.078 mm change in position will shift the 'view' seen by an observer. For slanted lenslet arrays, $dx_{mis}$ is 3 times more sensitive (0.026 mm).

Ideally, the angle of the lenslet array should align exactly along the display pixel line. Even 1 pixel change across the total height of the display screen will begin to cause deviations from the ideal image. So the angular sensitivity ($d\theta'_{mis}$) of the alignment of the lenslet array with respect to the display screen pixels is $$d\theta'_{mis} = 2\arctan\left(\frac{(1/2)(3/\sqrt{10})(1/3/PPI)}{Hs_{in}}\right). \quad (10)$$

where PPI is the pixels-per-inch linear pixel density, and $Hs_{in}$ is the active display screen height in inches. Equation (10) is for slanted lenslet array mounting on the display. For unslanted lenslet mounting, the $(3/\sqrt{10})$ factor in arctan should be removed. For the exemplary demonstrated digital integral cloak with slanted lenslets, $d\theta'_{mis}=(8.8\times10^{-3})°$. Increased resolution of displays used may require increasingly careful mounting of the lenslet array on the display screen, in both relative positioning and angular alignment.

C.2. Other Factors

Other causes of reduced image quality for the cloak include non-uniform bending of the lenslet array plane toward or away from the display screen, and aberrations of the lenslet arrays themselves. Since easily accessible lenslet arrays are spherical or cylindrical in curvature, even spherical aberrations are not corrected. These aberrations effectively increase the depth and transverse size of the focal point of the lenslet arrays. The result is that the display pixels will not be in focus and multiple display pixels will mix, causing blurring of the output image. Even simple lens optimizations of the lenslet array surfaces should improve the cloaking quality.

Real Time Digital Cloaking

Figure 18:
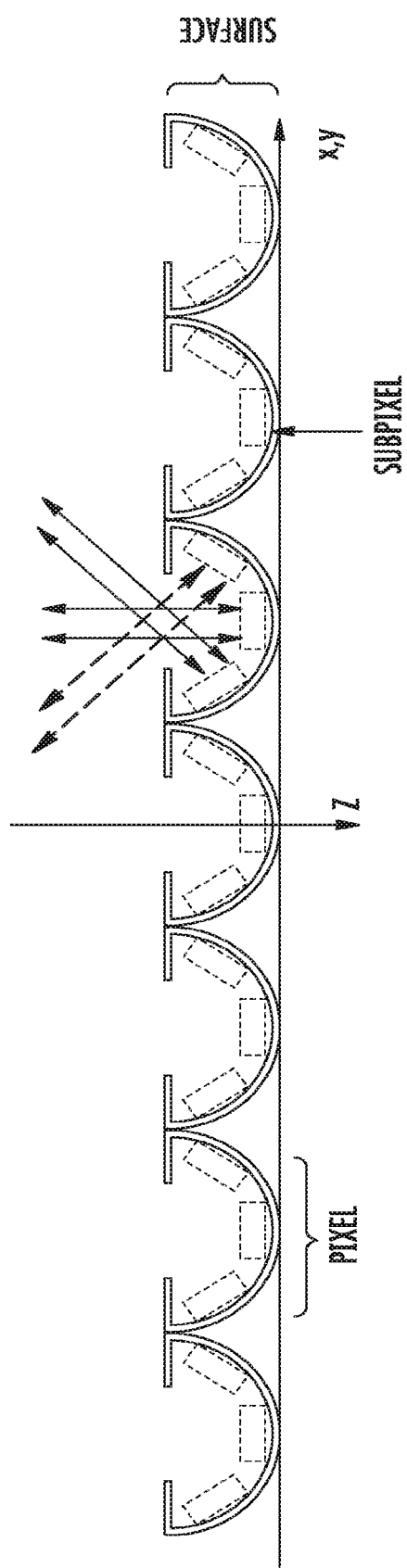
FIG. 18 shows an example of a lensless integral cloaking surface (cross-section view shown).

Real-time digital cloaking can be achieved using detector and display pixels combined with lenslet arrays (FIG. 10(b)), or using lensless integral cloaking surfaces instead (FIG. 18, discussed below). These surfaces can be formed around arbitrarily shaped cloaks, including the omnidirectional spherical cloak shown in FIG. 9(b).

Figure 15:
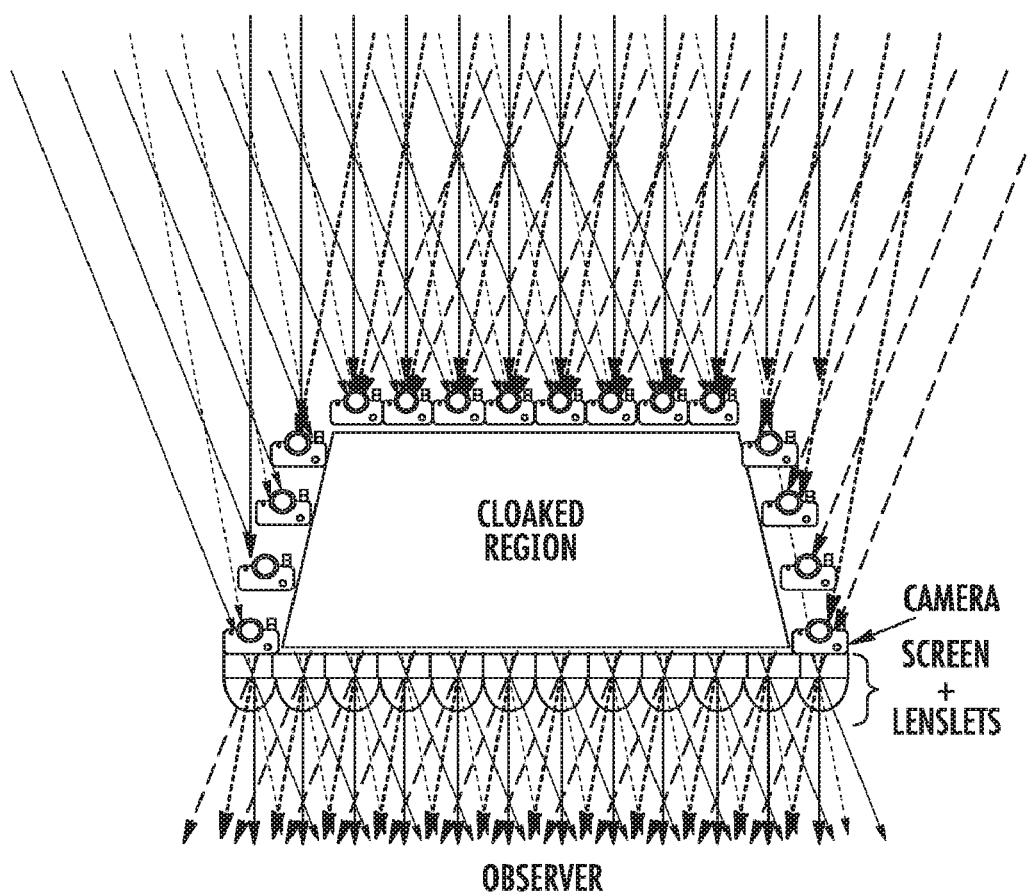
FIG. 15 shows an example of a real-time integral cloak (cross-section from top-view shown).

FIG. 15 shows an example of how to place tiny cameras (input) to capture all needed input rays almost perfectly for a given screen+lenslet combination (output). Tiny cameras, the size of the lenslet size, can be placed in various formations for cloaking. This example shows how to make a real-time integral cloak that projects background scenery (rays at top of figure, in front of cameras), to the observer (bottom of figure). While one formation is provided, other variations are possible for different shapes and sizes of cloaked region. The camera size needs to be the size of a lenslet or smaller, to not physically block rays. Typically it may be desirable to have as many cameras as number of lenslets, or more, as shown. The cameras on the side of the cloaked region, in FIG. 15, are not used efficiently, nor do they capture rays at exactly the right positions, either, unless more cameras are used, for example. The input rays captured from the camera can then be processed with wires and/or computer and algorithm to send to the screen and lenslet combination for proper output of cloaking light rays. FIG. 15 shows the cross-section of a cloak that transmits the background image to an observer in front of a 2D screen+ lenslet array combination, via one-way (top to bottom in the figure). However, a cloak that works both ways could be constructed by placing small detectors next to the display pixels.

Figure 16:
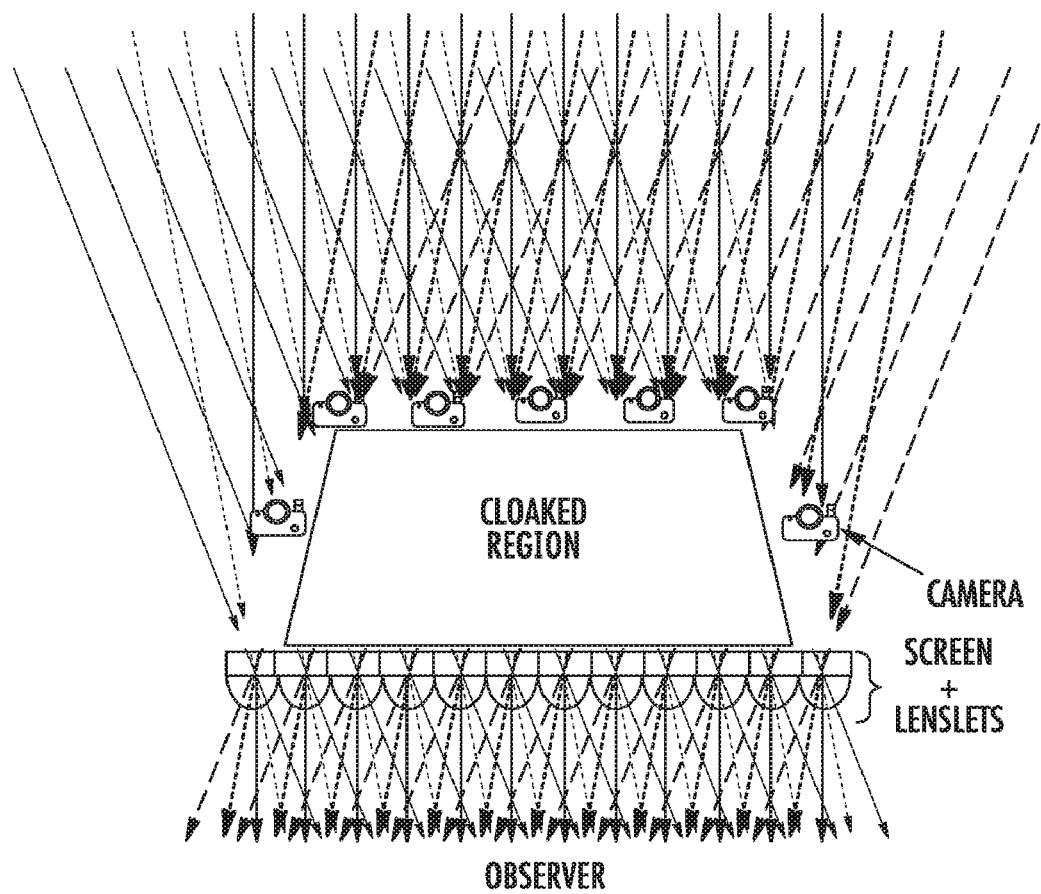
FIG. 16 shows an example of an approximated real time integral cloak (cross section from top-view shown).
Figure 17:
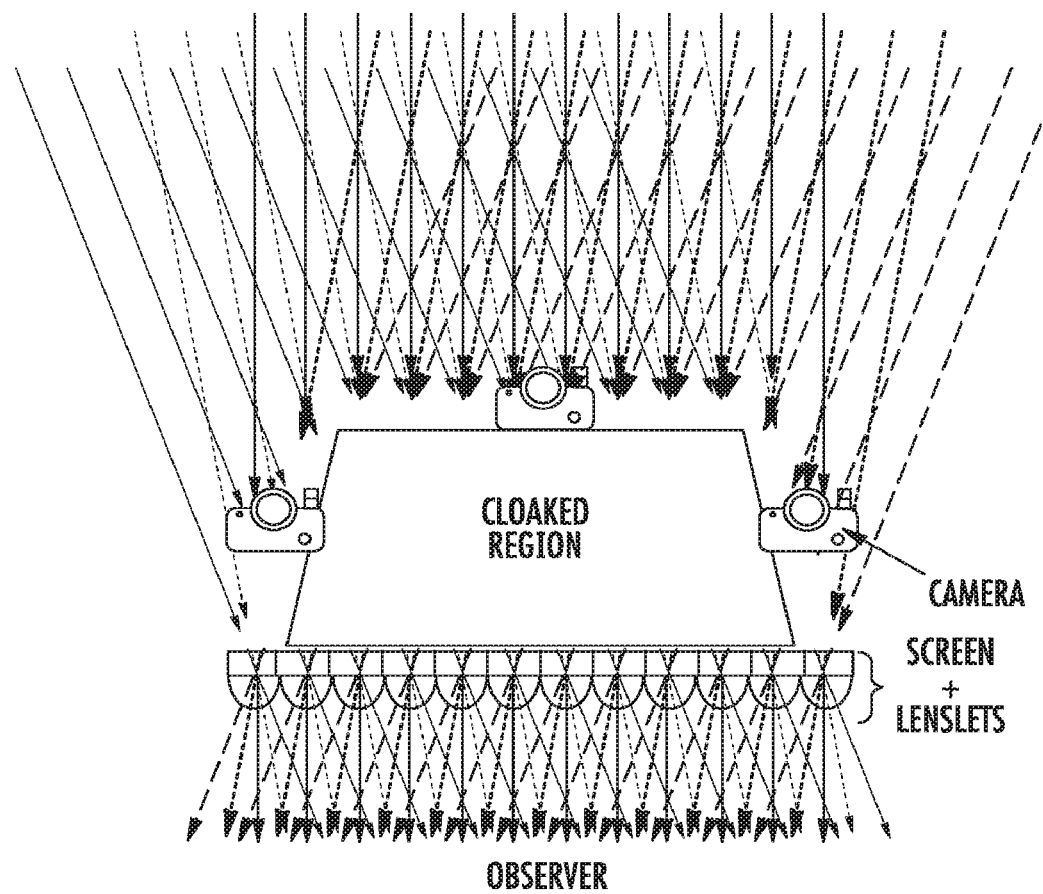
FIG. 17 shows another example of an approximated real time integral cloak (cross section from top-view shown).

Display pixels currently can be obtained commercially with high density in pixels per length/area. Lenslet arrays that are relatively dense in number of lenses per length/area can also be obtained commercially. These components may not be too expensive as they are used for consumer products. However, what is perhaps expensive to build and obtain may be the detector array, or an array of small cameras, to capture input rays. To build a practical real-time cloak, commercially available cameras may be utilized. The one or more cameras may be placed sparsely, and then the camera images may be interpolated to estimate the input rays that pass between the cameras (which are not captured). FIGS. 16 and 17 show some examples of such a sparse setup. In FIG. 16, limited number of cameras are spread out to capture input rays nearby. The output plane (screen+lenslet array) uses interpolation of camera images to approximate the rays that were not captured. In FIG. 17, few cameras are used, so a single camera image will need to generate more output cloaking rays with appropriate approximations. Such approximations can be key to building a real-time cloak when the detector equipment used does not fulfill the specifications needed for the display resolution. Also, by moving the cameras/detectors quickly, more input rays can be captured and improve the cloaking effect with finite number of cameras/detectors.

Connecting cameras and processing them in real-time may also be tricky, for large number of cameras. One scalable method to connect the cameras is to use internet protocol (IP) cameras or detectors combined with switches and/or routers. The input ray collection system is then akin to a network of cameras on the internet. Many connections can be made, including very large number of cameras/ detectors, just like there are a large number of computers and devices connected on the internet. Fast bandwidth can be obtained with commercially available routers and switches. This may not be as large of a bottleneck as one might assume for connecting a large number of devices simultaneously in real-time. This is because the image from one camera may be pulled at a time, the image may be processed for output, and then the process could proceed to the next camera and so forth, rather than pulling images from all cameras/ detectors at the same time. More camera images may be pulled simultaneously, up to the bandwidth of the connection. When the bandwidth limit of the connection is reached, parallel sets of routers and/or switches, corresponding to separate sets of cameras, may be used to increase the effective bandwidth of the connection. Regardless, the input collection time for all cameras/detectors, and the processing time will cause some delay to updating the output of the cloaking device. However, since a human observer or a machine has finite temporal resolution, the cloaking device can use the methods suggested to provide cloaking that appears real-time for the observer, as long as the delays are not noticeable.

DISCUSSION

The digital cloak demonstration discussed above for FIGS. 11 and 12 was dynamic, so that a changing background could be displayed properly, after a finite lag time for scanning and processing. Real-time cloaks were also discussed above for FIGS. 15-17. A static cloak for an observer with fixed z-position can also be obtained relatively simply by recording with a camera from the planned observer locations. For large observation distances, only a finite number of camera images are necessary (one image for each 'view') for reasonable results. The ray processing becomes simplified, with each 'view'/angle using a single camera location corresponding to that given view.

In some implementations, the phase of the light fields can be matched by including properly engineered materials for a fixed-shape cloak, or spatial light modulator arrays for a cloak with dynamic shapes. If each subpixel is assumed to correspond to a single ray position, angle, frequency, an input subpixel may be traced to its output subpixel (Equation (1)). To good approximation, each pair is then a unidirectional propagation from input subpixel to output subpixel (dotted lines in FIG. 10($b$)), with respect to a new z-axis. This allows the paraxial full-field cloaking theory to be used for each subpixel pair, to calculate the phase and dispersion necessary for phase-matching of light fields [6]. These assumptions and approximations become increasingly accurate as the cloak pixel size decreases.

Other methods for discretized or digital cloaking are also possible. Optical fibers or other optics, with good anti-reflection coatings, can be used to collect and transmit analog measurement values. Some advantages of this include cloaking in a passive (rather than active) manner, and that its spectrum can be continuously broadband. Additionally, a digital cloak without lenses is possible by using curved surfaces for detection and emission of rays. This is similar to one of the original methods proposed by Lippman for integral photography [16]. An example surface of such a cloak is shown in FIG. 18. In FIG. 18, detector and/or display subpixels can be placed on curved pixels. The top layer, which has holes for rays to pass, can be made to absorb light, or also detect incident light to calculate and compensate for irradiance losses. This method might be easier to mass-produce and align than integral cloaking with lenses, and its field-of-view will not be limited by lens curvatures (although limited in other ways). Lastly, with increased computational power and refined resolution, digital cloaking can be adapted to be wearable. Sensors can be used to determine the position and orientation for each pixel (or subpixel), with a processor calculating the correct ray propagation (Equation (1)) and output pixel (or subpixel). This will provide a wearable cloak, or suit, that can be dynamic in shape.

In conclusion, to approximate an ideal cloak for practical observation, discretized cloaking is proposed. In particular, a 2D digital cloak was demonstrated, called an 'integral cloak,' that uses commercially available digital technologies—A camera to capture the input rays, and a monitor+ cylindrical lenslet array for the output rays. The principles for generating a 3D integral cloak follow easily. Although the demonstration was for ray optics cloaking, other designs are suggested, including methods to match the phase of the light fields. Digital cloaking has good potential for wide implementation as a wearable cloak, since the digital technology required continue to improve commercially.

Those of skill in the art will recognize that the systems and methods described above can incorporate one or more computing devices, whether stand-alone computers, networked devices, or devices that are fully or partially integrated into the other devices and components described above. Computing devices may include a processor, a memory, and a bus. The memory may include a tangible, computer-readable memory on which code is stored. The processor may execute code stored in the memory by communication via the bus to cause the computing device to perform actions. The computing device may include an input/output (I/O) interface for communication with other components. The computing device may be any device that can process data and execute code that is a set of instructions to perform actions.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be compassed by the following claims. The claims can encompass embodiments in hardware, software, or a combination thereof.

REFERENCES, EACH OF WHICH IS INCORPORATED HEREIN BY REFERENCE IN THEIR ENTIRETY

1. G. Gbur, "Invisibility physics: Past, present, and future," Progress in Optics 58, 65-114 (2013).
2. J. B. Pendry, D. Schurig, and D. R. Smith, "Controlling electromagnetic fields," Science 312, 1780-1782 (2006).
3. U. Leonhardt, "Optical conformal mapping," Science 312, 1777-1780 (2006).
4. M. McCall, "Transformation optics and cloaking," Contemporary Physics 54, 273-286 (2013).
5. R. Fleury, F. Monticone, and A. Alu, "Invisibility and cloaking: Origins, present, and future perspectives," Physical Review Applied 4, 037001 (2015).
6. J. S. Choi and J. C. Howell, "Paraxial full-field cloaking," Optics Express 23, 15857-15862 (2015).
7. J. S. Li and J. B. Pendry, "Hiding under the carpet: A new strategy for cloaking," Physical Review Letters 101, 203901 (2008).
8. N. Landy and D. R. Smith, "A full-parameter unidirectional metamaterial cloak for microwaves," Nature Materials 12, 25-28 (2013).
9. J. C. Howell, J. B. Howell, and J. S. Choi, "Amplitude-only, passive, broadband, optical spatial cloaking of very large objects," Applied Optics 53, 1958-1963 (2014).
10. J. S. Choi and J. C. Howell, "Paraxial ray optics cloaking," Optics Express 22, 29465-29478 (2014).
11. R. Schittny, M. Kadic, T. Bueckmann, and M. Wegener, "Invisibility cloaking in a diffusive light scattering medium," Science 345, 427-429 (2014).
12. M. Bass, J. M. Enoch, and V. Lakshminarayanan, Vision and vision optics, vol. 3 of Handbook of optics (McGraw-Hill, New York, 2010), 3rd ed.
13. F. G. Vasquez, G. W. Milton, and D. Onofrei, "Active exterior cloaking for the 2d laplace and helmholtz equations," Physical Review Letters 103, 073901 (2009).
14. G. Lippmann, "Epreuves reversibles. photographies integrales," C. R. Acad. Sci. 146, 446-451 (1908).
15. J. Geng, "Three-dimensional display technologies," Advances in Optics and Photonics 5, 456-535 (2013).
16. "Integral photography," Scientific American 105, 164 (1911).

What is claimed is:
1. A cloaking system, comprising:
an electronic light detector configured to detect light approaching a cloaking volume from a first side, the electronically detected light characterized by a plurality of first light rays incident on the light detector;
an electronic light emitter configured to emit light away from a second side of the cloaking volume, the electronically emitted light characterized by a plurality of second light rays, the light emitter comprising a first lens array positioned over an emitter array;
wherein individual regions of the detector are each mapped to individual regions of the emitter such that detection of light at one of the individual regions of the detector results in emission of light at one of the individual regions of the emitter;
wherein a first region of the detector located at a longitudinal position $z_i$ and configured to detect a light ray characterized by a transverse position $y_i$ and an angle $\theta_i$ is mapped to a first region of the emitter located at a longitudinal position $z_f$ and configured to emit a light ray characterized by a transverse position $y_f$ and an angle $\theta_f$ such that:

$$\begin{bmatrix} y_f \\ n \tan \theta_f \end{bmatrix}_{z=z_f} = \begin{bmatrix} 1 & (z_f - z_i)/n \\ 0 & 1 \end{bmatrix} \begin{bmatrix} y_i \\ n \tan \theta_i \end{bmatrix}_{z=z_i}.$$

2. The cloaking system of claim 1, wherein the electronic light detector comprises a second lens array positioned over a detector array.
3. The cloaking system of claim 2, wherein the electronic light detector is configured to detect both positions and directions of at least some of the plurality of first light rays incident on the light detector.
4. The cloaking system of claim 2, wherein the electronic emitter array comprises a plurality of light emission regions, wherein at least some of the lenses of the first lens array are each positioned over a group of the plurality of light emission regions, wherein the electronic detector array comprises a plurality of light detection regions, wherein at least some of the lenses of the second lens array are each positioned over a group of the plurality of light detection regions.
5. The cloaking system of claim 4, wherein the first light detection and emission regions are aligned along a first axis, and a second light detection region corresponding to a second light emission region are aligned along a second axis, wherein the first and second axes are non-parallel.
6. The cloaking system of claim 5, wherein the light detection and emission regions include a third light detection region corresponding to a third light emission region, the third light detection and emission regions aligned along a third axis, wherein the first and third axes are non-parallel, wherein the second and third axes are parallel.
7. The cloaking system of claim 2, wherein the detector array comprises at least one solid state image sensor.
8. The cloaking system of claim 7, wherein the solid state image sensor comprises a CCD sensor or a CMOS sensor.
9. The cloaking system of claim 2, wherein the detector and emission arrays comprise fiber optics.
10. The cloaking system of claim 2, wherein the cloaking volume is between the detector and emitter arrays, wherein the detector and emitter arrays are between the first and second lens arrays.
11. The cloaking system of claim 1, wherein the cloaking system is configured to at least partially surround the cloaking volume.

12. The cloaking system of claim 11, wherein the electronic light detector and electronic light emitter are planar.

13. The cloaking system of claim 11, wherein at least one of the electronic light detector and electronic light emitter are curved or angular.

14. The cloaking system of claim 13, wherein the electronic light detector and electronic light emitter each include at least one edge, wherein the edge of the electronic light detector meets the edge of the electronic light emitter.

15. A method of cloaking a cloaking volume that is at least partially between a light detector and light emitter, the method comprising:
   measuring positions and directions of at least some of a first plurality of light rays approaching the light detector, the light detector comprising a first lens array configured to measure the positions of the light rays and a detector array configured to measure the directions of the light rays; and
   emitting a second plurality of light rays from the light emitter based on the measured positions and directions of the first plurality of light rays, the light emitter comprising a second lens array and an emitter array, wherein at least some of the second plurality of light rays are substantially aligned in positions and directions with at least some of the first plurality of light rays, such that the cloaking region is at least partially cloaked to human vision;
   wherein individual regions of the light detector are each mapped to individual regions of the light emitter such that detection of light at one of the individual regions of the light detector results in emission of light at one of the individual regions of the light emitter;
   wherein a first region of the light detector located at a longitudinal position $z_i$ and configured to detect a light ray characterized by a transverse position $y_i$ and an angle $\theta_i$ is mapped to a first region of the light emitter located at a longitudinal position $z_f$ and configured to emit a light ray characterized by a transverse position $y_f$ and an angle $\theta_f$ such that:

$$\begin{bmatrix} y_f \\ n \tan \theta_f \end{bmatrix}_{z=z_f} = \begin{bmatrix} 1 & (z_f - z_i)/n \\ 0 & 1 \end{bmatrix} \begin{bmatrix} y_i \\ n \tan \theta_i \end{bmatrix}_{z=z_i}.$$

16. A multi-directional cloaking system, comprising:
   a plurality of discrete electronic light detection pixels configured to detect light approaching a cloaking volume, the detected light characterized by a plurality of first light rays;
   a plurality of discrete electronic light emission pixels configured to emit light away from the cloaking volume, the emitted light characterized by a plurality of second light rays; the plurality of discrete electronic light emission pixels configured to emit the emitted light such that at least some of the second light rays are substantially aligned with at least some of the first light rays;
   wherein individual light detection pixels are each mapped to individual light emission pixels such that detection of light at one of the individual light detection pixels results in emission of light at one of the individual light emission pixels;
   wherein a first light detection pixel located at a longitudinal position $z_i$ and configured to detect a light ray characterized by a transverse position $y_i$ and an angle $\theta_i$ is mapped to a first light emission pixel located at a longitudinal position $z_f$ and configured to emit a light ray characterized by a transverse position $y_f$ and an angle $\theta_f$ such that:

$$\begin{bmatrix} y_f \\ n \tan \theta_f \end{bmatrix}_{z=z_f} = \begin{bmatrix} 1 & (z_f - z_i)/n \\ 0 & 1 \end{bmatrix} \begin{bmatrix} y_i \\ n \tan \theta_i \end{bmatrix}_{z=z_i}.$$

17. The multi-directional cloaking system of claim 16, wherein the multi-directional cloaking system is spherically symmetric.

18. The multi-directional cloaking system of claim 16, wherein at least some of the plurality of discrete electronic light emission pixels are spatially discrete, and wherein at least some of the plurality of discrete electronic light emission pixels each comprise a plurality of electronic discrete light emission sub-pixels corresponding to a plurality of discrete light emission directions.

19. The multi-directional cloaking system of claim 16, wherein at least some of the plurality of discrete electronic light detection pixels are spatially discrete, and wherein at least some of the plurality of discrete electronic light detection pixels each comprise a plurality of discrete light detection sub-pixels corresponding to a plurality of discrete light detection directions.

20. The multi-directional cloaking system of claim 19, wherein at least some of the plurality of discrete electronic light detection pixels comprise apertures; wherein at least some of the plurality of discrete light detection sub-pixels comprise non-planar arrays of light detectors beneath at least some of the apertures.

21. The multi-directional cloaking system of claim 19, wherein at least some of the plurality of discrete electronic light detection pixels comprise lenslets; wherein at least some of the plurality of discrete light detection sub-pixels comprise light detectors beneath at least some of the lenslets.

22. The multi-directional cloaking system of claim 16, wherein the mapping between the discrete light electronic detection pixels and discrete light electronic emission pixels is dynamic, such that movement of one or more of the discrete electronic light detection pixels relative to the discrete electronic light emission pixels changes the mapping between particular discrete electronic light emission pixels and electronic light detection pixels.

23. The multi-directional cloaking system of claim 16, wherein the multi-directional cloaking system is phase-matching.

24. A passive cloaking system comprising:
   an input lenslet array comprising a plurality of lenses for collecting light rays with direction and position properties;
   an output lenslet array comprising a plurality of lenses for emitting the collected light rays;
   wherein the input lenslet array and the output lenslet array define a cloaking region between the input lenslet array and the output lenslet array; and
   a plurality of optical fibers routed through the cloaking region and optically coupling lenses of the input lenslet array with lenses of the output lenslet array such that the light rays collected by the input lenslet array are emitted by the output lenslet array and such that at least some of the emitted light rays are substantially aligned with at least some of the collected light rays;

wherein individual input lenses are each mapped to individual output lenses such that collection of light at one of the individual input lenses results in emission of light at one of the individual output lenses;

wherein a first input lens located at a longitudinal position $z_i$ and configured to collect a light ray characterized by a transverse position $y_i$ and an angle $\theta_i$ is mapped to a first output lens located at a longitudinal position $z_f$ and configured to emit the collected light ray at a transverse position $y_f$ and an angle $\theta_f$ such that:

$$\begin{bmatrix} y_f \\ n \tan \theta_f \end{bmatrix}_{z=z_f} = \begin{bmatrix} 1 & (z_f - z_i)/n \\ 0 & 1 \end{bmatrix} \begin{bmatrix} y_i \\ n \tan \theta_i \end{bmatrix}_{z=z_i}.$$

25. The passive cloaking system of claim 24, wherein the emitted light rays preserve spectral properties of the collected light rays.

26. The passive cloaking system of claim 25, wherein the lenses of the input lenslet array focus collected light into a fiber core of a corresponding optical fiber.

27. The passive cloaking system of claim 26, wherein the plurality of optical fibers comprise multi-mode optical fibers.

\* \* \* \* \*